US011546125B2

United States Patent
Kim

(10) Patent No.: US 11,546,125 B2
(45) Date of Patent: Jan. 3, 2023

(54) METHOD OF TRANSMITTING AND RECEIVING DATA IN WIRELESS COMMUNICATION SYSTEM SUPPORTING FULL-DUPLEX RADIO AND APPARATUS THEREFOR

(71) Applicant: LG ELECTRONICS INC., Seoul (KR)

(72) Inventor: Soojin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 163 days.

(21) Appl. No.: 17/154,907

(22) Filed: Jan. 21, 2021

(65) Prior Publication Data

US 2022/0231825 A1 Jul. 21, 2022

(51) Int. Cl.
*H04L 5/14* (2006.01)
*H04L 25/03* (2006.01)
*H04B 7/024* (2017.01)
*H04W 48/08* (2009.01)

(52) U.S. Cl.
CPC ............... *H04L 5/14* (2013.01); *H04B 7/024* (2013.01); *H04L 25/03866* (2013.01); *H04W 48/08* (2013.01)

(58) Field of Classification Search
CPC ..... H04L 5/14; H04L 25/03866; H04B 7/024; H04W 48/08
See application file for complete search history.

(56) References Cited

U.S. PATENT DOCUMENTS

| 2004/0180674 | A1* | 9/2004 | Blomqvist | H04W 4/02 455/456.5 |
| 2010/0197298 | A1* | 8/2010 | So | H04W 24/10 455/424 |
| 2011/0116476 | A1* | 5/2011 | Lee | H04W 52/241 370/328 |
| 2012/0083263 | A1* | 4/2012 | Kim | H04W 72/085 455/423 |
| 2015/0079990 | A1* | 3/2015 | Yun | H04W 36/00835 455/436 |

* cited by examiner

*Primary Examiner* — Tejis Daya
(74) *Attorney, Agent, or Firm* — Lee, Hong, Degerman, Kang & Waimey PC

(57) ABSTRACT

A method of transmitting and receiving a signal by a serving base station (BS) in a wireless communication system is disclosed. The method includes receiving, from a user equipment (UE), an uplink (UL) signal including a cell identifier (ID) of a first BS transmitting a downlink (DL) signal to the UE, determining whether the cell ID of the first BS is identical to a cell ID of the serving BS, transmitting a DL signal to the UE based on the cell ID of the first BS being identical to the cell ID of the serving BS, and transmitting information on the UL signal to the first BS based on the cell ID of the first BS being different from the cell ID of the serving BS. The UE supports full-duplex radio, and the UL signal includes a feedback for a DL signal transmitted by the first BS.

15 Claims, 26 Drawing Sheets

(a)

(b)

METHOD OF TRANSMITTING AND RECEIVING DATA IN WIRELESS COMMUNICATION SYSTEM SUPPORTING FULL-DUPLEX RADIO AND APPARATUS THEREFOR

BACKGROUND

Field

The present disclosure relates to a method of transmitting and receiving data related to full-duplex radio (FDR) in a wireless communication system supporting FDR and an apparatus therefor.

Discussion of the Related Art

A wireless communication system is a multiple access system that supports communication with multiple users by sharing available system resources (e.g., bandwidth, transmit power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Sidelink (SL) refers to a communication scheme in which a direct link is established between user equipments (UEs) and the UEs directly exchange voice or data without intervention of a base station (BS). SL is considered as one method of relieving a burden on the BS due to rapidly growing data traffic.

A UE or a vehicle may receive resources allocated for an uplink signal and resources allocated for a downlink signal from the BS. The UE or the vehicle may receive the resources allocated for the uplink signal through uplink control information (UCI) from the BS or receive the resources allocated for the downlink signal through downlink control information (DCI) from the BS.

As more and more communication devices demand larger communication capacity, there is a need for enhanced mobile broadband (eMBB) communication relative to legacy radio access technology (RAT). Accordingly, a communication system is under discussion, for which services or UEs sensitive to reliability and latency are considered. Next-generation RAT in which eMBB communication, machine type communication (MTC), and ultra-reliable and low-latency communication (URLLC) are considered may be referred to as new RAT or NR. In NR, vehicle-to-everything (V2X) communication may also be supported.

SUMMARY

Provided is a method of, transmitting information (a channel state feedback such as a channel quality indicator (CQI) or an acknowledgement/negative acknowledgment (ACK/NACK)) received on uplink (UL) from a user equipment (UE) to a next generation Node B (gNB) operating on downlink (DL) for the UE, when the DL and UL between the gNB and the UE are managed separately in a system allowing inter-cell cooperation like coordinated multi-point transmission and reception (CoMP), in which the gNBs operate in half-duplex mode and the UE operates in full-duplex mode.

It will be appreciated by persons skilled in the art that the objects that could be achieved with the present disclosure are not limited to what has been particularly described hereinabove and the above and other objects that the present disclosure could achieve will be more clearly understood from the following detailed description.

According to an aspect of the disclosure, a method of transmitting and receiving a signal by a serving base station (BS) in a wireless communication system includes receiving, from a UE, a UL signal including a cell identifier (ID) of a first BS transmitting a DL signal to the UE, determining whether the cell ID of the first BS is identical to a cell ID of the serving BS, transmitting a DL signal to the UE based on the cell ID of the first BS being identical to the cell ID of the serving BS, and transmitting information on the UL signal to the first BS based on the cell ID of the first BS being different from the cell ID of the serving BS. The UE supports full-duplex radio, and the UL signal includes a feedback for a DL signal transmitted by the first BS.

The first BS and the serving BS may operate in CoMP.

A scrambling sequence generated by using the cell ID of the first BS may have been applied to the UL signal.

A message header of data included in the UL signal may include the cell ID of the first BS.

The cell ID of the first BS may be received in a radio resource control (RRC) message.

The method may further include descrambling the UL signal based on the cell ID of the serving BS.

The method may further include decoding the UL signal, and the determination may include determining whether the cell ID of the first BS is identical to the cell ID of the serving BS based on the message header.

According to another aspect of the disclosure, a serving BS for transmitting and receiving a signal in a wireless communication system includes a transmitter, a receiver, and a processor. The receiver is configured to receive, from a UE, a UL signal including a cell identifier (ID) of a first BS transmitting a DL signal to the UE, the processor is configured to determine whether the cell ID of the first BS is identical to a cell ID of the serving BS, and the transmitter is configured to transmit a DL signal to the UE based on the cell ID of the first BS being identical to the cell ID of the serving BS, and transmit information on the UL signal to the first BS based on the cell ID of the first BS being different from the cell ID of the serving BS. The UE supports full-duplex radio, and the UL signal includes a feedback for a DL signal transmitted by the first BS.

According to another aspect of the disclosure, a method of transmitting and receiving a signal by a UE in a wireless communication system includes transmitting, to a serving BS, a UL signal including a cell identifier (ID) of a first BS transmitting a DL signal to the UE, and receiving a DL signal from the BS based on the cell ID of the first BS being identical to the cell ID of the serving BS. Based on the cell ID of the first BS being different from the cell ID of the serving the serving BS, information on the UL signal is transmitted to the first BS through the serving BS. The UE supports full-duplex radio, and the UL signal includes a feedback for a DL signal transmitted by the first BS.

According to another aspect of the disclosure, a UE for transmitting and receiving a signal in a wireless communication system includes a transmitter, a receiver, and a processor. The transmitter is configured to transmit, to a serving BS, a UL signal including a cell ID of a first BS transmitting a DL signal to the UE, and the receiver is configured to receive a DL signal from the BS based on the cell ID of the first BS being identical to the cell ID of the serving BS. Based on the cell ID of the first BS being different from the cell ID of the serving BS, information on the UL signal is transmitted to the first BS through the serving BS. The UE supports full-duplex radio, and the UL signal includes a feedback for a DL signal transmitted by the first BS.

According to another aspect of the disclosure, an apparatus for a UE includes at least one processor, and at least one computer memory operatively coupled to the at least one processor and storing instructions which, when executed, cause the at least one processor to perform operations. The operations include transmitting, to a serving BS, a UL signal including a cell ID of a first BS transmitting a DL signal to the UE, and receiving a DL signal from the BS based on the cell ID of the first BS being identical to the cell ID of the serving BS. Based on the cell ID of the first BS being different from the cell ID of the serving BS, information on the UL signal is transmitted to the first BS through the serving BS. The UE supports full-duplex radio, and the UL signal includes a feedback for a DL signal transmitted by the first BS.

According to another aspect of the disclosure, a computer-readable storage medium stores at least one computer program including instructions which, when executed by at least one processor, cause the at least one processor to perform operations for a UE. The operations include transmitting, to a serving BS, a UL signal including a cell ID of a first BS transmitting a DL signal to the UE, and receiving a DL signal from the BS based on the cell ID of the first BS being identical to the cell ID of the serving BS. Based on the cell ID of the first BS being different from the cell ID of the serving BS, information on the UL signal is transmitted to the first BS through the serving BS. The UE supports full-duplex radio, and the UL signal includes a feedback for a DL signal transmitted by the first BS.

BRIEF DESCRIPTION OF THE DRAWINGS

The accompanying drawings, which are included to provide a further understanding of the present disclosure, illustrate various implementation examples of the present disclosure and together with the description serve to explain the principle of the present disclosure. In the drawings.

DETAILED DESCRIPTION

Figure 1:
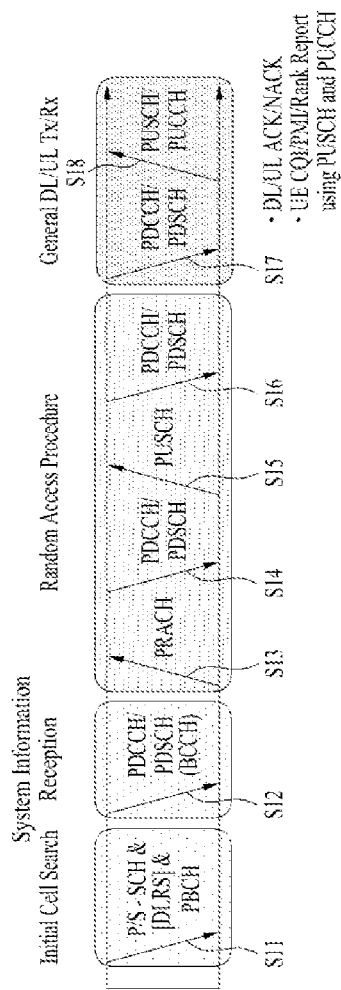
FIG. 1 is a diagram illustrating physical channels used in various embodiments of the present disclosure and a signal transmission method using the same.

A wireless communication system is a multiple access system that supports communication with multiple users by sharing available system resources (e.g., bandwidth, transmit power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Sidelink (SL) refers to a communication scheme in which a direct link is established between user equipments (UEs) and the UEs directly exchange voice or data without intervention of a base station (BS). SL is considered as one method of relieving a burden on the BS due to rapidly growing data traffic.

Vehicle-to-everything (V2X) is a communication technology that allows a vehicle to exchange information with another vehicle, a pedestrian, and infrastructure. V2X has four subsets including vehicle-to-vehicle (V2V), vehicle-to-infrastructure (V2I), vehicle-to-network (V2N), and vehicleto-pedestrian (V2P). V2X communication may be conducted over a PC5 interface and/or a Uu interface.

As more and more communication devices demand larger communication capacity, there is a need for enhanced mobile broadband (eMBB) communication relative to legacy radio access technology (RAT). Accordingly, a communication system is under discussion, for which services or UEs sensitive to reliability and latency are considered. Next-generation RAT in which eMBB communication, machine type communication (MTC), and ultra-reliable and low-latency communication (URLLC) are considered may be referred to as new RAT or NR. In NR, vehicle-to-everything (V2X) communication may also be supported.

Technology described below may be used in various wireless access systems such as a code division multiple access (CDMA) system, a frequency division multiple access (FDMA) system, a time division multiple access (TDMA) system, an orthogonal frequency division multiple access (OFDMA) system, and a single-carrier frequency division multiple access (SC-FDMA) system. CDMA may be implemented by radio technology such as universal terrestrial radio access (UTRA) or CDMA2000. TDMA may be implemented by radio technology such as global system for mobile communications (GSM), general packet radio service (GPRS), or enhanced data rates for GSM evolution (EDGE). OFDMA may be implemented by radio technology such as institute of electrical and electronics engineers (IEEE) 802.11 (Wi-Fi), IEEE 802.16 (WiMAX), IEEE 802.20, or evolved-UTRA (E-UTRA). UTRA is part of universal mobile telecommunications system (UMTS). 3rd generation partnership project (3GPP) long-term evolution (LTE) is part of evolved UMTS (E-UMTS) using E-UTRA and LTE-advanced (LTE-A)/LTE-A pro is an evolved version of 3GPP LTE. 3GPP new radio or new radio access technology (3GPP NR) is an evolved version of 3GPP LTE/LTE-A pro.

A successor to LTE-A, $5^{th}$ generation new radio access technology (5G NR) is a new clean-slate type of mobile communication system characterized by high performance, low latency, and high availability. 5G NR may use all available spectral resources from a low-frequency band below 1 GHz to an intermediate frequency band at 1 GHz to 10 GHz and to a high frequency (millimeter wave) band at or above 24 GHz.

To clarify the technical features of various embodiments of the present disclosure, the various embodiments of the present disclosure will be described in the context of a 3GPP NR system as well as a 3GPP LTE/LTE-A system. However, the same thing is also applicable to an IEEE 802.16e/m system.

In a wireless access system, a UE receives information from a BS on downlink (DL) and transmits information to the BS on uplink (UL). Information transmitted and received by the BS and the UE includes general data information and various types of control information, and various physical channels exist according to the types/usages of the information transmitted and received between the BS and the UE.

Overview of 3GPP System

Physical Channels and General Signal Transmission

In a wireless access system, a UE receives information from a BS on DL and transmits information to the BS on UL. Information transmitted and received by the BS and the UE includes general data information and various control information, and various physical channels exist according to the types/usages of the information transmitted and received between the BS and the UE.

FIG. 1 is a diagram illustrating physical channels used in various embodiments of the present disclosure and a signal transmission method using the same.

When a UE is powered on again from a power-off state or enters a new cell, the UE performs an initial cell search procedure, such as acquisition of synchronization to a BS (S11). To this end, the UE establishes synchronization with the BS by receiving a primary synchronization channel (P-SCH) and a secondary synchronization channel (S-SCH) from the BS and acquires information such as a cell identity (ID).

Then the UE may acquire information broadcast in a cell by receiving a PBCH signal from the BS.

In the initial cell search procedure, the UE may monitor a DL channel status by receiving a DL RS.

Upon completion of the initial cell search procedure, the UE may acquire more detailed system information by receiving a PDCCH and a PDSCH according to information carried on the PDCCH (S12).

Next, the UE may perform a random access procedure in order to complete access to the BS (S13 to S16). To this end, the UE may transmit a preamble through a PRACH (S13) and receive a random access response (RAR) to the preamble through the PDCCH and the PDSCH corresponding to the PDCCH (S14). The UE may transmit a PUSCH using scheduling information in the RAR (S15) and perform a contention resolution procedure such as reception of a PDCCH signal and reception of a PDSCH signal corresponding to the PDCCH signal (S16).

Meanwhile, the random access procedure is performed in two steps, S13 and S15 may be performed as one operation in which the UE performs transmission, and S14 and S16 may be performed as one operation in which the BS performs transmission.

The UE that has performed the above-described procedure may receive a PDCCH signal and/or a PDSCH signal (S17) and/or transmit a PUSCH signal and/or a PUCCH signal (S18), as a general UL/DL signal transmission procedure.

Control information that the UE transmits to the BS is collectively referred to as UCI. The UCI includes hybrid automatic repeat request-acknowledgment/negative acknowledgement (HARQ-ACK/NACK), scheduling request (SR), channel quality indicator (CQI), precoding matrix index (PMI), and rank indicator (RI) information.

Generally, the UCI is periodically transmitted through the PUCCH. However, when control information and data should be simultaneously transmitted, the UCI may be transmitted through the PUSCH. In addition, the UE may aperiodically transmit the UCI through the PUSCH according to the request/indication of a network.

New Radio Access Technology (NR)

As more and more communication devices demand larger communication capacity, there is a need for eMBB communication relative to legacy RAT. In addition, massive machine type communication (mMTC) for providing various services at anytime and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, mMTC, URLLC, and the like. In the present disclosure, such technology is referred to as NR. NR is an expression representing an example of 5G RAT.

A new RAT system including NR uses an OFDM transmission scheme or a transmission scheme similar thereto. The new RAT system may follow OFDM parameters different from OFDM parameters of LTE. Alternatively, the new RAT system may follow numerology of legacy LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in the frequency domain. Different numerologies may be defined by scaling a reference subcarrier spacing to an integer N.

Figure 2:
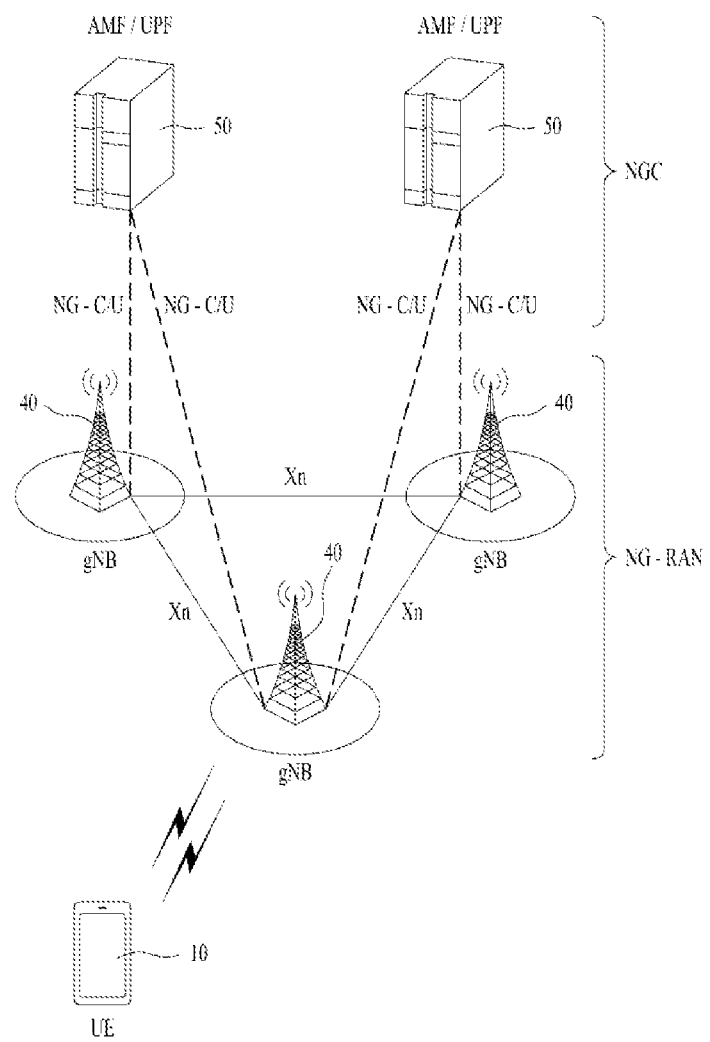
FIG. 2 illustrates the structure of a new radio access technology (NR) system.

FIG. 2 illustrates the structure of an NR system.

Referring to FIG. 2, a next-generation radio access network (NG-RAN) may include a gNB and/or an eNB that provides a UE with user plane and control plane protocol termination points. FIG. 2 shows that the NG-RAN includes only the gNB. The gNB and the eNB are connected with each other by means of an Xn interface. The gNB and the eNB are also connected to a 5G core network (5GC) by means of an NG interface. More specifically, the gNB and the eNB are connected to an access and mobility management function (AMF) by means of an NG-C interface and to a user plane function (UPF) by means of an NG-U interface.

Figure 3:
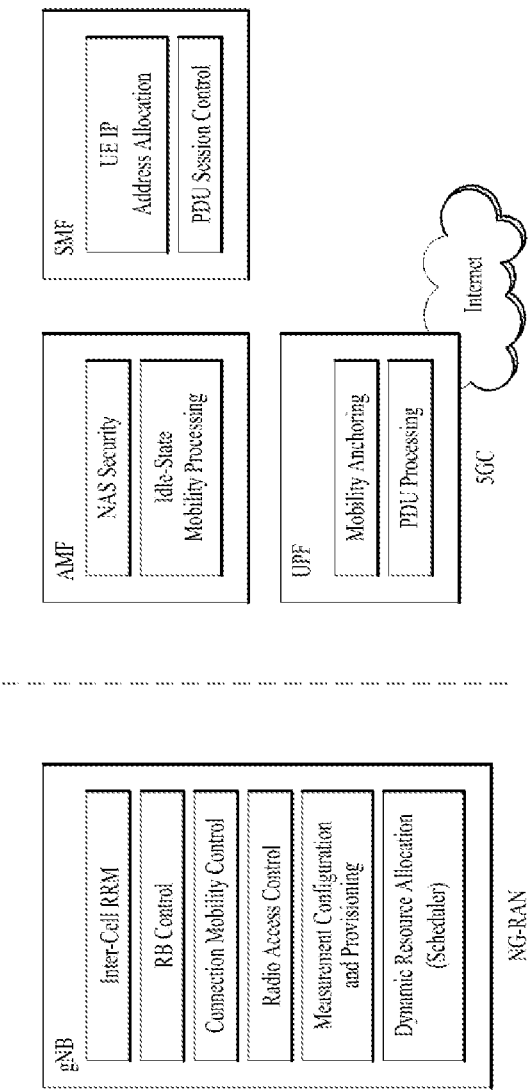
FIG. 3 illustrates functional split between a next generation radio access network (NG-RAN) and a 5$^{th}$ generation core network (5GC)

FIG. 3 illustrates functional split between an NG-RAN and a 5GC.

Referring to FIG. 3, a gNB may provide functions, such as inter-cell radio resource management (RRM), radio bearer control, connection mobility control, radio admission control, measurement configuration and provision, dynamic resource allocation, etc. An AMF may provide functions, such as NAS security, idle state mobility handling, etc. A UPF may provide functions, such as mobility anchoring, protocol data unit (PDU) handling, etc. A session management function (SMF) may provide functions, such as UE IP address allocation, PDU session control, etc.

Figure 4:
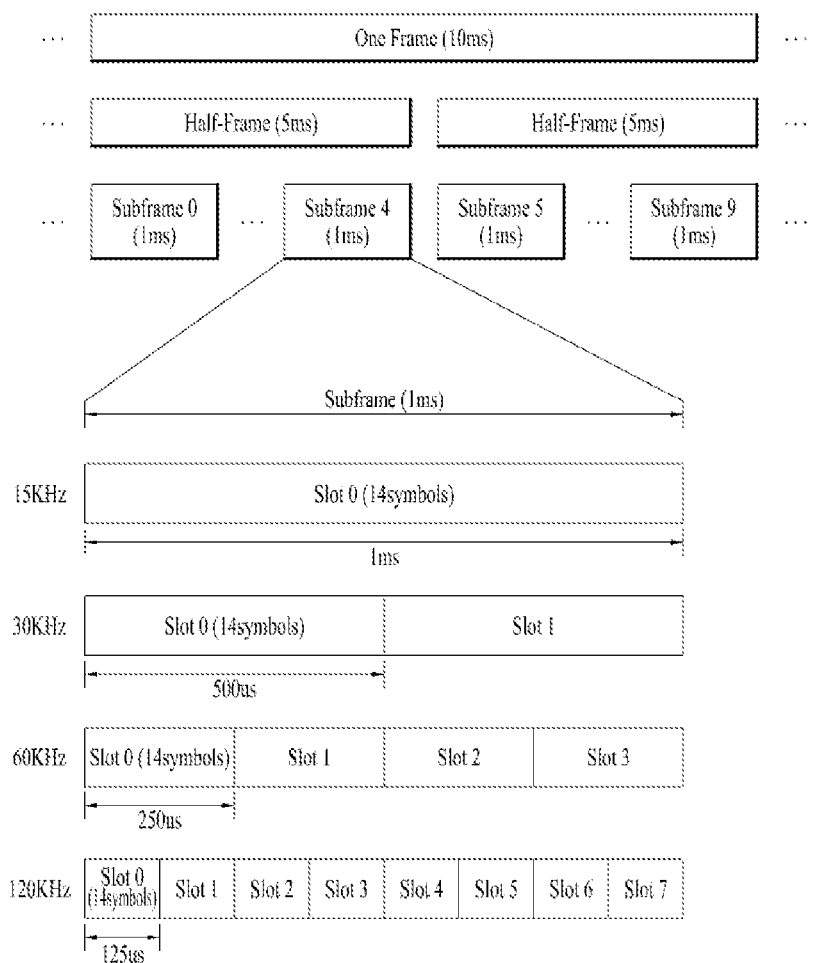
FIG. 4 illustrates the structure of an NR radio frame.

FIG. 4 illustrates the structure of an NR radio frame.

Referring to FIG. 4, a radio frame may be used for UL and DL transmission in NR. The radio frame is 10 ms long and may be defined as two half-frames (HFs), each 5 ms long. An HF may include 5 subframes (SFs), each 1 ms long. An SF may be split into one or more slots. The number of slots in the SF may be determined based on a subcarrier spacing (SCS). Each slot may include 12 or 14 OFDM(A) symbols depending on a cyclic prefix (CP).

When a normal CP is used, each slot may include 14 symbols. When an extended CP is used, each slot may include 12 symbols. Here, a symbol may include an OFDM symbol (or CP-time resource duration) or an SC-FDMA symbol (or discrete Fourier transform-spread-OFDM (DFT-s-OFDM) symbol).

Table 1 below shows the number of symbols per slot, $N^{slot}_{symb}$, the number of slots per frame, $N^{frame,u}_{slot}$, and the number of slots per subframe, $N^{subframe,u}_{slot}$ according to SCS configuration u when the normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows the number of symbols per slot, the number of slots per frame, and the number of slots per subframe according to SCS when the extended CP is used.

TABLE 2

| SCS (15*2u) | Nslotsymb | Nframe, uslot | Nsubframe, uslot |
|---|---|---|---|
| 60 KHz (u = 2) | 12 | 40 | 4 |

In an NR system, different OFDM(A) numerologies (e.g., SCSs and CP lengths) may be configured between a plurality of cells aggregated for one UE. Then, an (absolute time) duration of a time resource (e.g., a subframe, a slot, or a transmission time interval (TTI)) consisting of the same number of symbols (for convenience, referred to as a time unit (TU)) may be differently configured between the aggregated cells.

NR supports a plurality of numerologies or SCSs to support various 5G services. For example, when an SCS is 15 kHz, a wide area in traditional cellular bands may be supported. When the SCS is 30 kHz or 60 kHz, a dense-urban, lower latency, and wider carrier bandwidth may be supported. When the SCS is 60 kHz or higher, bandwidth greater than 24.25 kHz may be supported in order to overcome phase noise.

An NR frequency band defines two types of frequency ranges. The two types of frequency ranges may be FR1 and FR2. The frequency ranges may vary in number. For example, the two types of frequency ranges are shown in Table 3 below. Among the frequency ranges used in the NR system, FR1 may represent refer to "sub-6 GHz range", and FR2 may represent "above 6 GHz range" and may be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the frequency ranges of the NR system may vary in number. For example, FR1 may include a band of 410 MHz to 7125 MHz as shown in Table 4 below. That is, FR1 may include a frequency band above 6 GHz (or 5850, 5900, 5925 MHz, etc.). For example, a frequency band above 6 GHz (or 5850, 5900, 5925 MHz, etc.) included in FR1 may include an unlicensed band. The unlicensed band may be used for various purposes, for example, communication for a vehicle (e.g., a self-driving vehicle).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
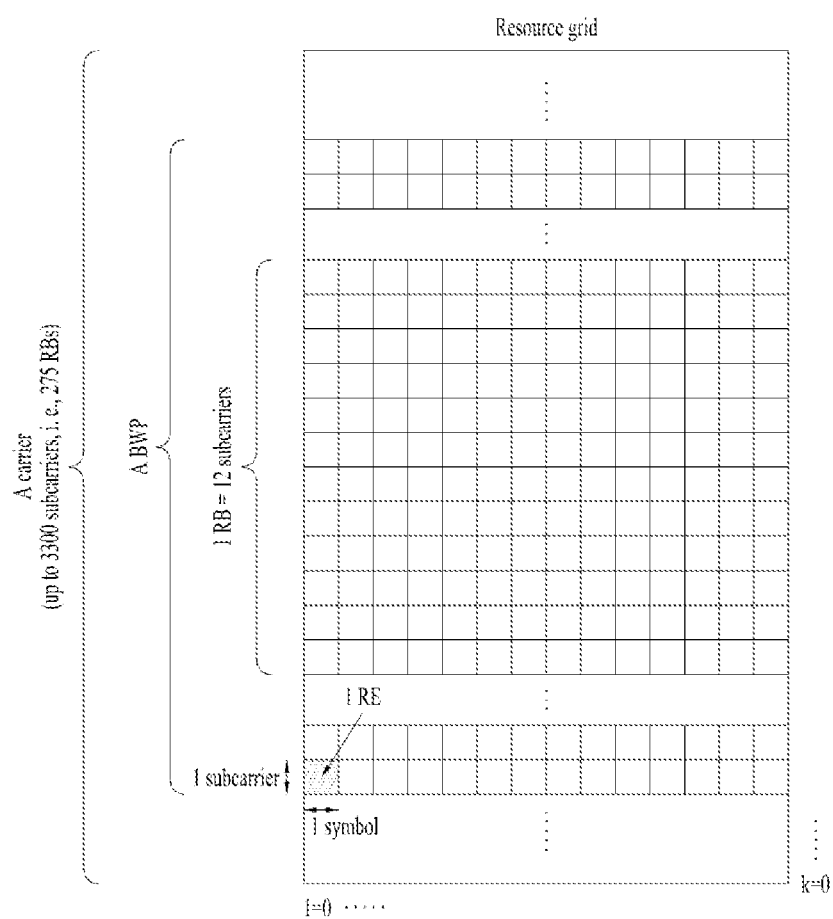
FIG. 5 illustrates a slot structure of an NR frame.

FIG. 5 illustrates a slot structure of an NR frame.

Referring to FIG. 5, a slot includes a plurality of symbols in the time domain. For example, one slot may include 14 symbols for a normal CP, whereas one slot may include 12 symbols for an extended CP. Alternatively, one slot may include 7 symbols for the normal CP, whereas one slot may include 6 symbols for the extended CP.

A carrier includes a plurality of subcarriers in the frequency domain. A resource block (RB) may be defined as multiple (e.g., 12) contiguous subcarriers in the frequency domain. A bandwidth part (BWP) may be defined as a plurality of contiguous (physical) resource blocks ((P)RBs) in the frequency domain and may correspond to one numerology (e.g., SCS or CP length). The carrier may include a maximum of N (e.g., 5) BWPs. Data communication may be performed through an activated BWP. Each element may be referred to as an RE in a resource grid, and one complex symbol may be mapped to the RE.

Meanwhile, a radio interface between UEs or a radio interface between a UE and a network may consist of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
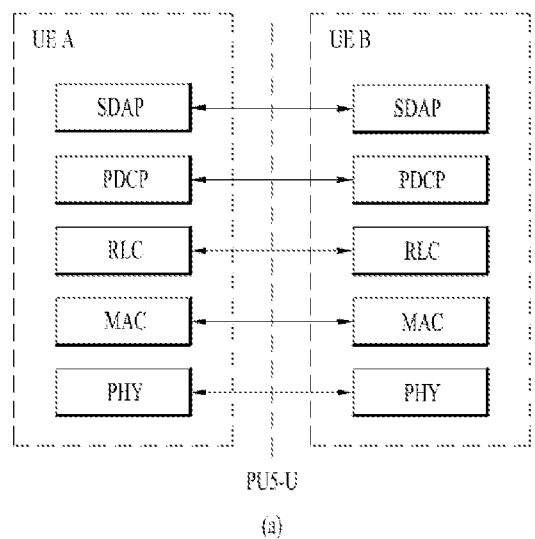
FIG. 6 illustrates a radio protocol architecture for sidelink (SL) communication.
Figure 6:
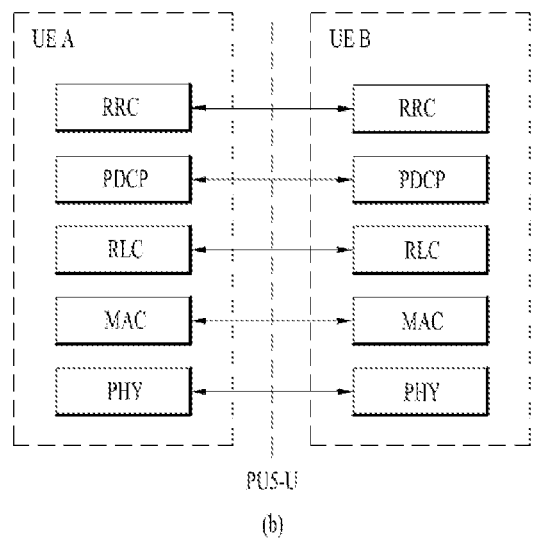

FIG. 6 illustrates a radio protocol architecture for SL communication. Specifically, FIG. 6A illustrates a user plane protocol stack of NR and FIG. 6B illustrates a control plane protocol stack of NR.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which should be first known by the UE before SL signal transmission and reception. For example, the default information may be information related to an SLSS, a duplex mode (DM), a time division duplex (TDD) UL/DL configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured SL BWP. For example, the S-SSB may have a BW of 11 RBs. For example, the PSBCH may exist across 11 RBs. In addition, a frequency position of the S-SSB may be (pre-)configured. Accordingly, the UE does not have to perform hypothesis detection in frequencies to discover the S-SSB in the carrier.

In the NR SL system, a plurality of numerologies including different SCSs and/or CP lengths may be supported. As an SCS increases, the length of a time resource for S-SSB transmission of a transmitting UE may be shortened. Then, coverage of the S-SSB may be reduced. Accordingly, in order to ensure coverage of the S-SSB, the transmitting UE may transmit one or more S-SSBs to a receiving terminal within one S-SSB transmission period according to the SCS. For example, the number of S-SSBs that the transmitting terminal transmits to the receiving terminal within one S-SSB transmission period may be preconfigured or configured for the transmitting UE. For example, the S-SSB transmission period may be 160 ms. For example, for all SCSs, an S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16, or 32 S-SSBs to the receiving UE within one S-SSB transmission period. For example, when the SCS is 120 kHz in FR2, the transmitting UE may transmit 1, 2, 4, 8, 16, 32, or 64 S-SSBs to the receiving UE within one S-SSB transmission period.

When the SCS is 60 kHz, two types of CPs may be supported. Further, the structure of an S-SSB transmitted by the transmitting UE to the receiving UE may be different according to a CP type. For example, the CP type may be a normal CP (NCP) or an extended CP (ECP). More specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol of the S-SSB transmitted by the transmitting UE. For example, upon receipt of the S-SSB, the receiving UE may perform an automatic gain control (AGC) operation in the first symbol period of the S-SSB.

Figure 7:
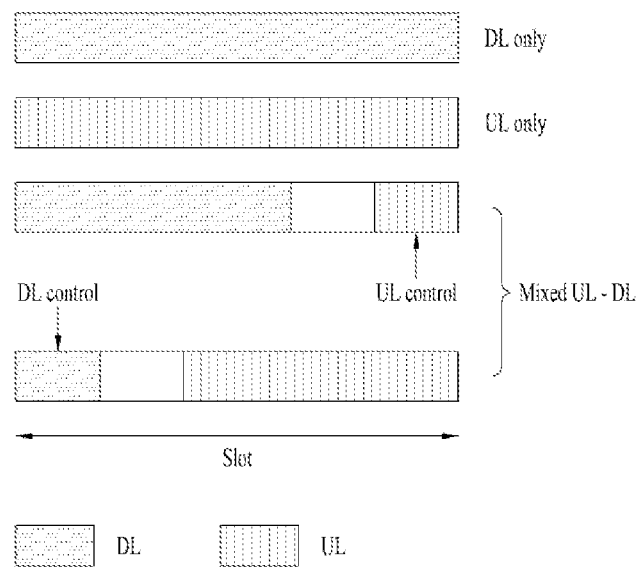
FIG. 7 illustrates the structure of a self-contained slot.

FIG. 7 illustrates the structure of a self-contained slot.

In the NR system, a frame is characterized by a self-contained structure in which all of a DL control channel, DL or UL data, and a UL control channel may be included in one slot. For example, the first N symbols (referred to as a DL control region) of a slot may be used to carry the DL control channel, and the last M symbols (referred to as a UL control region) of the slot may be used to carry the UL control channel. Each of N and M is an integer equal to or greater than 0. A resource area (referred to as a data region) between the DL control region and the UL control region may be used for DL data transmission or UL data transmission. For example, the following configurations may be considered. Each period is arranged in time order.

1. DL only configuration
   2. UL only configuration
   3. Mixed UL-DL configuration
   DL region+guard period (GP)+UL control region
   DL control region+GP+UL region
   DL region: (i) DL data region, (ii) DL control region+DL data region
   UL region: (i) UL data region, (ii) UL data region+UL control region A PDCCH may be transmitted in the DL control region, and a PDSCH may be transmitted in the DL data region. A PUCCH may be transmitted in the UL control region, and a PUSCH may be transmitted in the UL data region. The PDCCH may deliver DCI, for example, DL data scheduling information and UL data scheduling information. The PUCCH may deliver UCI, for example, ACK/NACK information for DL data, CSI, and an SR. The GP provides a time gap during which a BS and a UE transition from a transmission mode to a reception mode or from the reception mode to the transmission mode. Some symbols at the time of DL-to-UL switching in a subframe may be configured as the GP.

In the present disclosure, the BS may be, for example, a gNodeB (or gNB).

Figure 8:
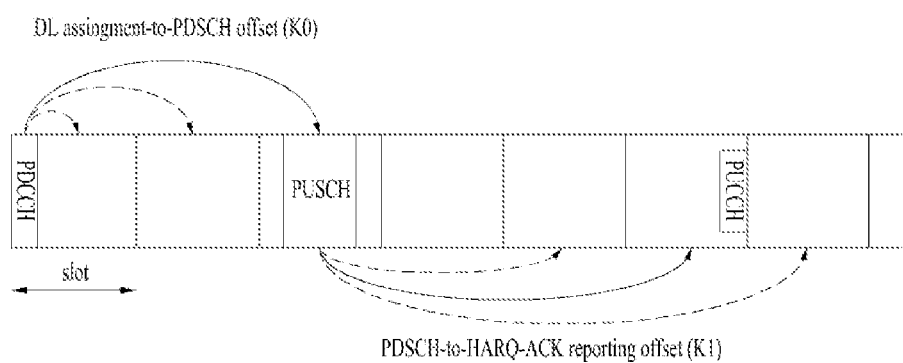
FIG. 8 illustrates an acknowledgment/negative acknowledgment (ACK/NACK) transmission process.

FIG. 8 is a diagram illustrating an ACK/NACK transmission process.

Referring to FIG. 8, a UE may detect a PDCCH in slot #n. The PDCCH delivers DL scheduling information (e.g., DCI format 1_0 or DCI format 1_1) and indicates a DL assignment-to-PDSCH offset, K0 and a PDSCH-HARQ-ACK reporting offset, K1. For example, DCI format 1_0 and DCI format 1_1 may include the following information.

Frequency domain resource assignment: this indicates an RB set allocated to a PDSCH.

Time domain resource assignment: this indicates K0, the starting position (e.g. OFDM symbol index) of the PDSCH in a slot, and the length (e.g., the number of OFDM symbols) of the PDSCH.

PDSCH-to-HARQ_feedback timing indicator: this indicates K1.

Subsequently, the UE may receive the PDSCH in slot #(n+K0) according to the scheduling information in slot #n, and then transmit UCI on a PUCCH in slot #(n+K1). The UCI includes an HARQ-ACK response to the PDSCH. When the PDSCH is configured to deliver up to one TB, the HARQ-ACK response may be configured in one bit. When the PDSCH is configured to deliver up to two TBs, the HARQ-ACK response may be configured in two bits in the case of non-spatial bundling and in one bit in the case of spatial bundling. When an HARQ-ACK transmission timing is set to slot #(n+K1) for a plurality of PDSCHs, UCI transmitted in slot #(n+K1) includes HARQ-ACK responses to the plurality of PDSCHs.

Overview of FDR System and Interference Element in FDR

A full-duplex radio (FDR) transmission and reception system capable of simultaneously transmitting and receiving UL and DL signals in the same frequency band may increase to a maximum of twice frequency efficiency (spectral efficiency) as compared to a legacy system for transmitting and receiving UL and DL signals based on frequency and time division and thus has been spotlighted as one of core technologies of a next-generation 5G mobile communication system.

FDR using a single frequency transmission band may be defined as a transmission resource configuration scheme for simultaneously performing transmission and reception through the single frequency transmission band from the viewpoint of an arbitrary wireless device. A special example thereof may be represented as, in wireless communication between a general BS (a relay, a relay node, or a remote radio head (RRH)) and a wireless UE, a transmission resource configuration method of simultaneously performing DL transmission and UL reception of the BS and DL reception and UL transmission of the wireless UE. Another example may be represented as a transmission resource configuration method of simultaneously performing transmission and reception between the wireless UEs in the same frequency transmission band in device-to-device direct communication (D2D) between wireless UEs. While wireless transmission and reception between the general BS and the wireless UE and proposed techniques related to FDR are described in the present disclosure, a wireless network device for performing wireless transmission and reception with a UE other than the general BS may be included in the preset disclosure and direct communication between UEs may also be included.

Figure 9:
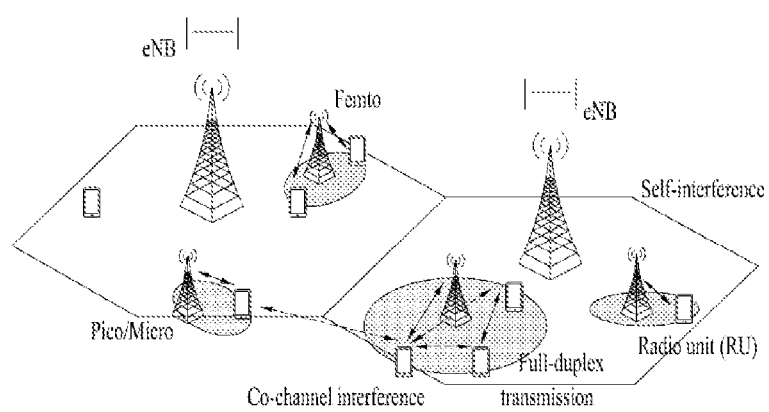
FIG. 9 is a conceptual diagram of a UE and a base station (BS) that support full-duplex radio (FDR)

FIG. 9 is a conceptual diagram of a UE and a BS that support FDR.

In an FDR situation illustrated in FIG. 9, the following three types of interference are produced.

Intra-device self-interference: Because transmission and reception are performed on the same time and frequency resources, a desired signal and a signal transmitted from the BS or UE are received at the same time at the BS or UE. The transmitted signal is received with almost no attenuation at a reception antenna of the BS or UE, and thus with much larger power than the desired signal. As a result, the transmitted signal serves as interference.

UE-to-UE inter-link interference: A UL signal transmitted by the UE is received at an adjacent UE and thus serves as interference.

BS-to-BS inter-link interference: The BS-to-BS inter-link interference refers to interference caused by signals that are transmitted between BSs or heterogeneous BSs (a picocell, a femtocell, and a relay) in a heterogeneous network (HetNet) state and received by a reception antenna of another BS.

Among such three types of interference, intra-device self-interference (hereinafter, self-interference (SI)) is generated only in an FDR system to significantly deteriorate performance of the FDR system. Therefore, first of all, intra-device SI needs to be cancelled in order to operate the FDR system.

Figure 10:
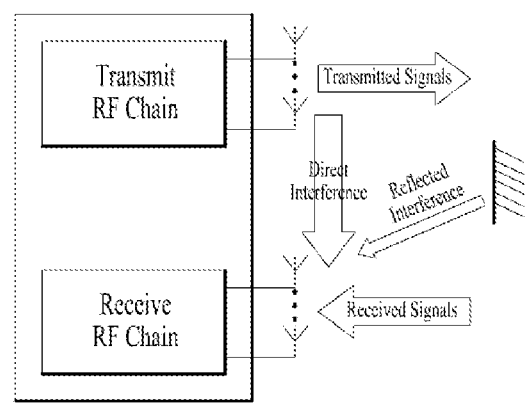
FIG. 10 is a diagram illustrating the concept of a transmission/reception link and self-interference (SI) in an FDR communication situation.

FIG. 10 is a diagram illustrating the concept of a transmission/reception link and SI in an FDR communication situation.

As illustrated in FIG. 10, SI may be divided into direct interference caused when a signal transmitted from a transmit (Tx) antenna directly enters a receive (Rx) antenna without path attenuation, and reflected interference reflected by peripheral topology. The level of SI is dramatically higher than a desired signal due to a physical distance difference. Due to the dramatically large interference intensity, efficient SI cancellation is necessary to operate the FDR system.

To effectively operate the FDR system, self-interference cancellation (self-IC) requirements with respect to the maximum transmission power of devices (in the case in which FDR is applied to a mobile communication system (bandwidth (BW)=20 MHz)) may be determined as illustrated in Table 5 below.

TABLE 5

| Node Type | Max. Tx Power ($P_A$) | Thermal Noise, (BW = 20 MHz) | Receiver NF | Receiver Thermal Noise Level | Self-IC Target ($P_A$ − TN − NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to Table 5, it may be noted that, to effectively operate the FDR system in a 20-MHz BW, the UE needs 119-dBm self-IC performance. A thermal noise value may be changed to $N_{0,BW}$=−174 dBm+10×$\log_{10}$(BW) according to the BW of the mobile communication system. In Table 5, the thermal noise value is calculated on the assumption of a 20-MHz BW. In relation to Table 5, for a receiver noise figure (NF), a worst case is considered with reference to the 3GPP specification requirements. A receiver thermal noise level is determined to be the sum of a thermal noise value and a receiver NF in a specific BW.

Types of Self-IC Schemes and Methods of Applying Self-IC Schemes

Figure 11:
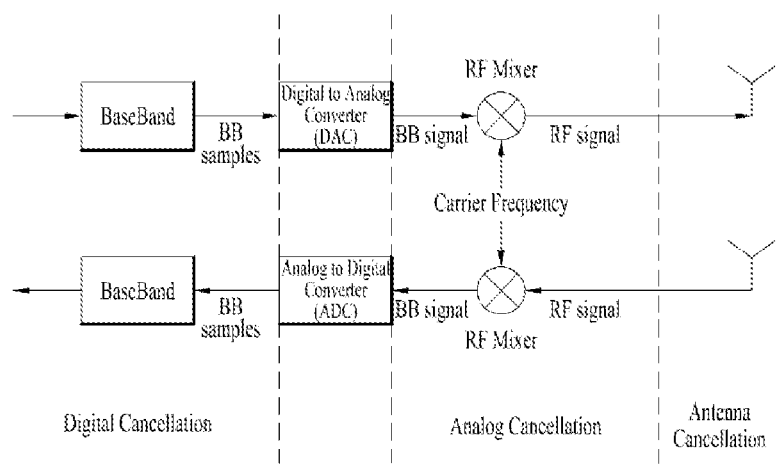
FIG. 11 is a diagram illustrating positions at which three self-interference cancellation (self-IC) schemes are applied, in a radio frequency (RF) transmit/receive end (or an RF front end) of a device.

FIG. 11 is a diagram illustrating positions at which three self-IC schemes are applied, in an RF Tx/Rx end (or an RF front end) of a device. Hereinafter, a brief description will be given of the three self-IC schemes.

Antenna self-IC: Antenna self-IC is a self-IC scheme that should be performed first among all self-IC schemes. SI is cancelled at an antenna end. Most simply, transfer of an SI signal may be physically blocked by placing a signal-blocking object between a Tx antenna and an Rx antenna, or a part of an SI signal may be canceled by artificially controlling the distance between antennas using multiple antennas or by inverting a phase of a specific Tx signal. Further, a part of an SI signal may be cancelled by means of multiple polarized antennas or directional antennas.

Analog self-IC: Interference is canceled at an analog end before an Rx signal passes through an ADC. An SI signal is canceled using a duplicated analog signal. This operation may be performed in an RF region or an intermediate frequency (IF) region. A specific SI signal cancellation method is described below. A duplicate of an actually received SI signal is generated by delaying an analog Tx signal and then controlling the amplitude and phase of the delayed Tx signal, and the duplicate signal is subtracted from a signal received at an Rx antenna. However, due to analog signal-based processing, the resulting implementation complexity and circuit characteristics may cause additional distortion, thereby significantly changing IC performance.

Digital self-IC: Interference is canceled after an Rx signal passes through an ADC. Digital self-IC covers all IC techniques performed in a baseband region. Most simply, a duplicate of an SI signal is generated using a digital Tx signal, and the duplicate signal is subtracted from an Rx digital signal. Alternatively, techniques of performing pre-coding/postcoding in a baseband using multiple antennas so that a Tx signal of a UE or a BS may not be received at an Rx antenna may be classified as digital self-IC. However, since digital self-IC is performed only when a digital modulated signal is quantized to a level sufficient to recover information of a desired signal, there is a need for the prerequisite that the difference between signal powers of an interference signal remaining after IC using one of the above-described techniques and a designed signal should fall into an ADC range in order to perform digital Self-IC.

Figure 12:
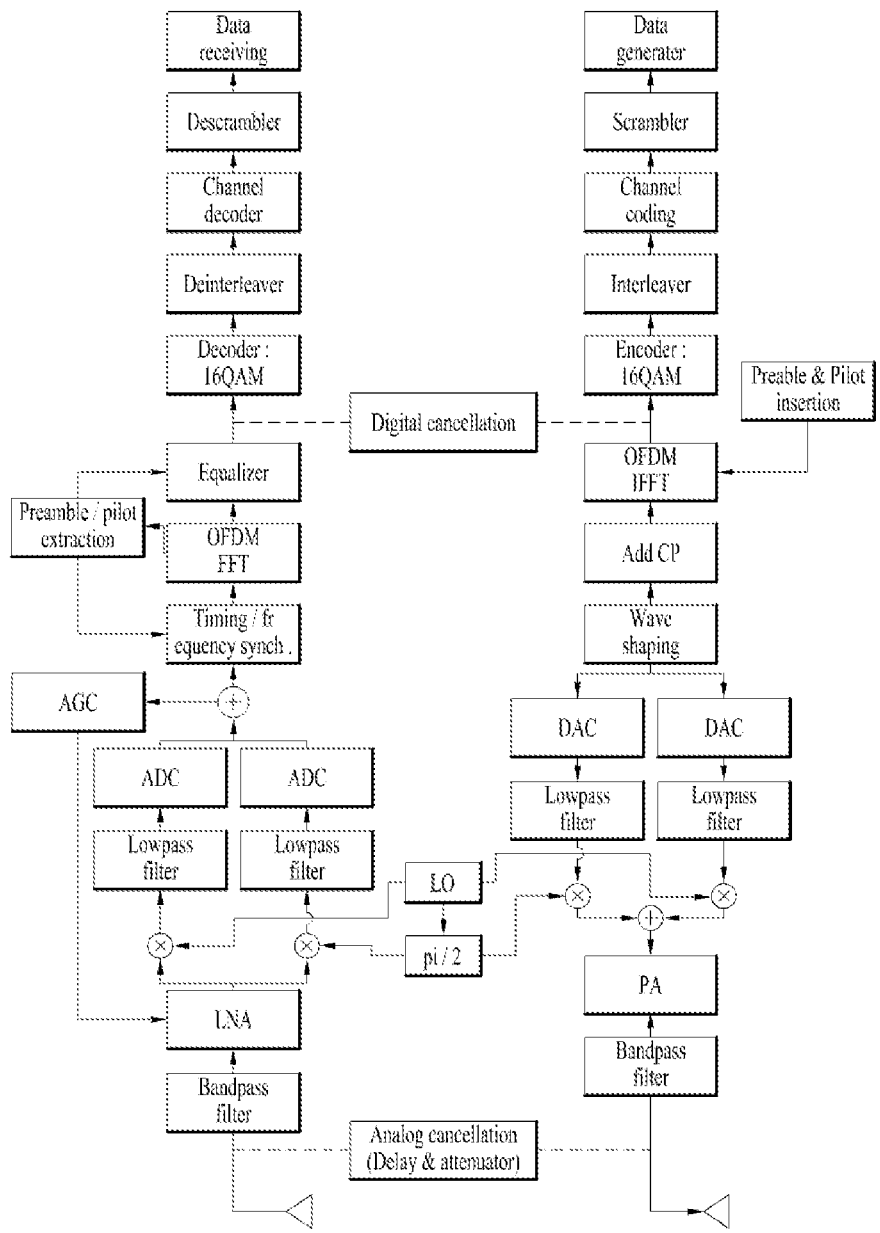
FIG. 12 is a block diagram illustrating a self-IC device in a proposed communication apparatus in an orthogonal frequency division multiplexing (OFDM) communication environment based on FIG. 14.

FIG. 12 is a block diagram of a self-IC device in a proposed communication apparatus in an OFDM communication environment based on FIG. 11.

While FIG. 12 shows that digital self-IC is performed using digital SI signal information before digital-to-analog conversion and after analog-to-digital conversion, digital self-IC may be performed using a digital SI signal after inverse fast Fourier transform (IFFT) and before fast Fourier transform (FFT). In addition, although FIG. 12 is a conceptual diagram of self-IC though separation of a Tx antenna and an Rx antenna, if antenna IC is performed using a single antenna, an antenna configuration scheme may be different from antenna configuration of FIG. 12. A functional block may be added to or removed from the self-IC device of FIG. 12 according to purpose.

Signal Modeling of FDR System

Since the FDR system uses the same frequency between a Tx signal and an Rx signal, non-linear components in RF significantly affect the Tx and Rx signals. In particular, the Tx signal is distorted by non-linear properties of active elements such as a power amplifier (PA) of a Tx RF chain and a low-noise amplifier (LNA) of an Rx RF chain, such distortion may be modified by a mixer in the Tx/Rx RF chain. Due to such distortion, the Tx signal may be modeled as generation of components corresponding to a high order. Components corresponding to an even order among the high-order components have influence on the vicinity of direct current (DC) and a high frequency region corresponding to several multiples of a center frequency and thus may be efficiently cancelled using an existing alternating current (AC) coupling or filtering scheme. However, components corresponding to an odd order are generated in the vicinity of a center frequency and thus cannot be easily cancelled unlike the even order components, thereby having a significant influence on reception. In consideration of non-linear properties of the odd-order components, an Rx signal subjected to ADC in the FDR system may be expressed using the Parallel Hammerstein (PH) model as shown in Equation 1 below.

$$y(n) = h_D(n) * x_D(n) + \sum_{\substack{k=1,\ldots,K \\ k=odd}} h_{SI,k}(n) * |x_{SI}(n)|^{k-1} x_{SI}(n) + z(n), \quad \text{[Equation 1]}$$

where $x_D(n)$ denotes data to be received, $h_D(n)$ denotes a desired channel experienced by data to be received, $x_{SI}(n)$ denotes data transmitted by a Tx end, $h_{SI,k}(n)$ denotes a self-channel experienced by data transmitted by the Tx end and indicates a linear component for k=1 and a non-linear component for k having an odd number of 3 or more, and $z(n)$ denotes additive white Gaussian noise (AWGN).

For the afore-described analog or digital self-IC, self-channel estimation is required. A received signal after self-IC based on an estimated analog or digital self-channel gain $\hat{h}_{SI,k}(n)$ may be expressed as the following equation.

$$y_{Self-IC}(n) = h_D(n) * x_D(n) + \underbrace{\sum_{\substack{k=1,\ldots,K \\ k=odd}} \left(h_{SI,k}(n) - \hat{h}_{SI,k}(n)\right) * |x_{SI}(n)|^{k-1} x_{SI}(n) + z(n),}_{\text{Residual SI}}$$ [Equation 2]

The received signal is decoded using an estimated gain $\hat{h}_D(n)$ of a desired channel according to Equation 3.

$$\frac{\hat{h}_D^*(n) y_{Self-IC}(n)}{|\hat{h}_D^*(n)|^2} = \frac{\hat{h}_D^*(n) * h_D(n)}{|\hat{h}_D^*(n)|^2} x_D(n) + \frac{\hat{h}_D^*(n) * z'(n)}{|\hat{h}_D^*(n)|^2}$$ [Equation 3]

$$= x_D(n) + \frac{\hat{h}_D^*(n) * e(n)}{|\hat{h}_D^*(n)|^2} + \frac{\hat{h}_D^*(n) * z'(n)}{|\hat{h}_D^*(n)|^2}$$

where $$z'(n) = \sum_{\substack{k=1,\ldots,K \\ k=odd}} \left(h_{SI,k}(n) - \hat{h}_{SI,k}(n)\right) * |x_{SI}(n)|^{k-1} x_{SI}(n) + z(n)$$

and $$e(n) = h_D(n) - \hat{h}_D(n).$$

Figure 13:
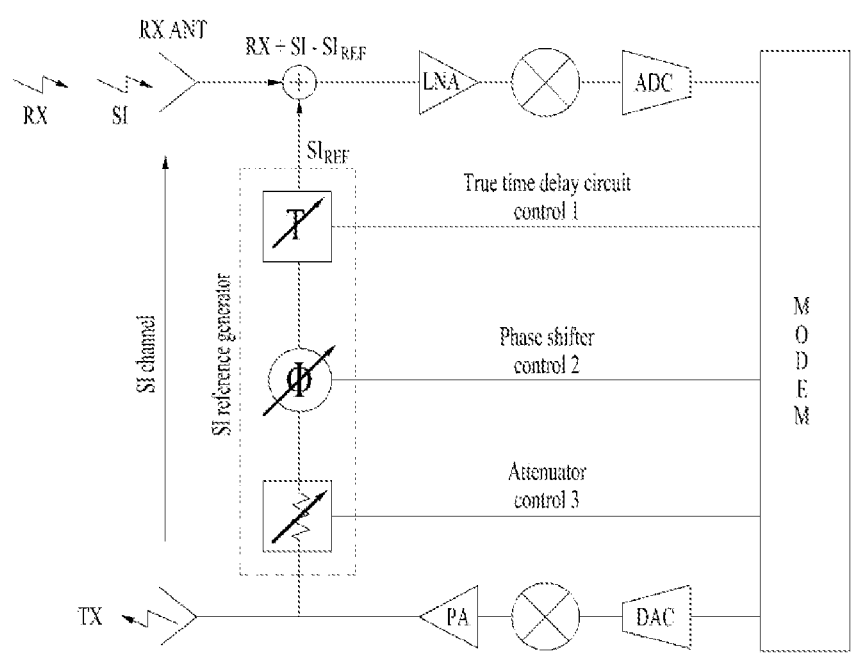
FIG. 13 is a diagram illustrating an RF chain of a communication device for performing general FDR technology.

FIG. 13 is a diagram illustrating an RF chain of a communication device for performing general FDR technology.

In order to cancel an SI signal in a communication device using FDR, it is necessary to generate a duplicate signal, which is exactly identical to the SI signal, (hereinafter, an SI RS). Referring to FIG. 13, for cancellation of the SI signal, a method of subtracting the SI RS $SI_{REF}$ from the SI signal before an Rx signal arrives at an LNA of an Rx end of the RX chain is generally used. In order to generate the SI RS $SI_{REF}$, a communication device branches a Tx signal of a Tx end (the Tx signal is branched after passing through a PA of the Tx end in FIG. 13) and causes a portion of the Tx signal to pass through an SI reference generator including an attenuator, a phase shifter, and a true time delay circuit. The SI reference generator generates the SI RS to copy an SI channel using the branched Tx signal. In order for the SI reference generator to copy the SI channel, a channel through which the SI signal is received is separately estimated.

The communication device may estimate the SI channel and then generate a control signal input to the true time delay circuit, a control signal input to the phase shifter, and a control signal input to the attenuator. In this case, the communication device should be in a state in which all of the SI RS and a desired Rx signal are not received.

The communication device may control the SI reference generator using two methods.

According to the first method, in order to separately estimate the channel through which the SI signal is received, the communication device may stop performing communication and transmit an SI channel estimation signal (e.g., a pilot signal, an RS, etc.) in an allocated communication band (or a channel band), and the SI reference generator may copy the SI signal using information about the SI channel estimation signal upon communication.

According to the second method, the communication device may transmit the SI channel estimation signal (e.g., an RS, a pilot signal, a tone, etc.) carried in both ends (e.g., a guard band) of a communication channel band and control the SI reference generator so as to reduce power of the corresponding SI channel estimation signal according to an adaptive feedback algorithm.

In the first method, it is necessary to first estimate the SI channel in order to find an optimized state of the SI reference generator. To this end, an Rx device (or an Rx side) as well as a Tx device (or a Tx side) should stop performing communication. In addition, even though perfect SI channel estimation is performed, a channel of an SI reference path needs to be very precisely calibrated. The channel of the SI reference path should be configured through a lookup table based on a combination of all control voltages. Even when the lookup table is accurately composed using a specific Tx power and temperature, the lookup table is supposed to change depending on an original Tx power and a temperature of a circuit. Hence, SI signal cancellation performance is inevitably degraded due to a calibration error and a difference in condition between a current Tx power and temperature and a Tx power and temperature at the timing of composing the lookup table. Moreover, it is difficult for the lookup table to follow an SI signal channel (or SI channel) that changes depending on time.

In the second method, since the communication device may transmit the SI channel estimation signal (the tone, pilot signal, RS, etc.) carried in both sides of a communication band without stopping performing communication and continuously control the SI reference generator in time using the adaptive feedback algorithm, calibration of the SI reference generator is unnecessary. However, since the SI reference generator is controlled using a tone of a guard band in both sides of the communication band, instead of using the communication band, an SI signal caused by transmission of a tone inside the communication band, which is most important, is not cancelled.

Figure 14:
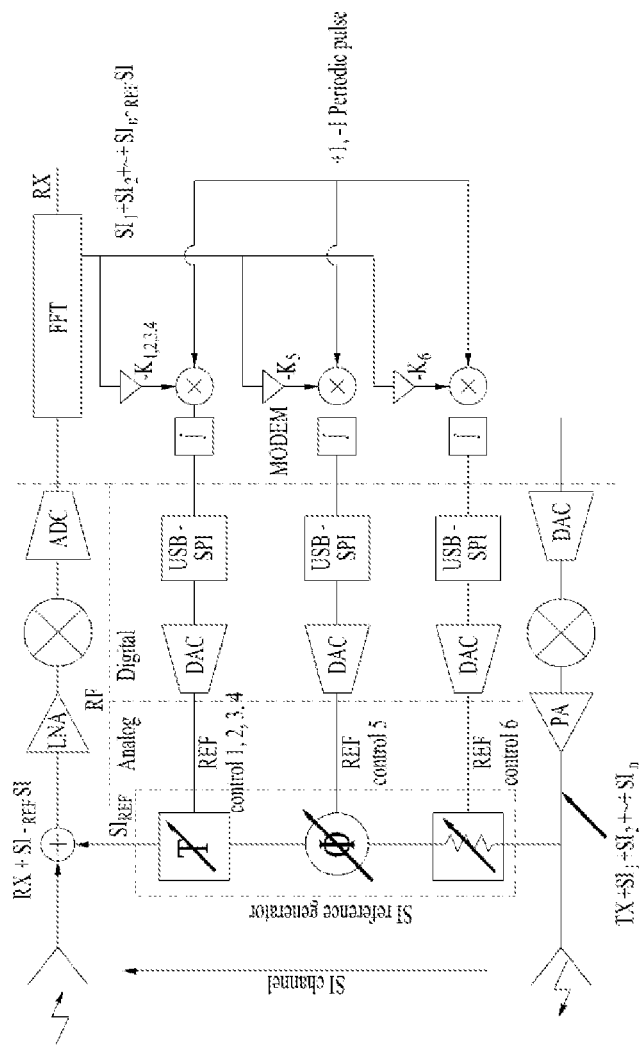
FIG. 14 is a diagram illustrating an example of an RF chain structure of a communication device for cancelling an SI signal when an FDR scheme is used.

FIG. 14 is a diagram illustrating an example of an RF chain structure of a communication device for cancelling an SI signal when an FDR scheme is used.

Referring to FIG. 14, the RF chain of the communication device may include a communication modem (or a modem), an SI reference generator, a Tx antenna, an Rx antenna, etc. The communication modem may include a fast Fourier transform (FFT) unit and integrators. The SI reference generator may include an attenuator, a phase shifter, and a true time delay circuit.

To precisely generate (or duplicate) an SI RS, the SI reference generator may control all of the attenuator, the phase shifter, and the true time delay circuit in an analog manner. To this end, the RF chain may include digital-to-analog converters (DACs) that convert control signals transmitted by the communication modem (or modem) into analog signals.

According to the concept of a true time delay defined basically as a slope of phase shift to a frequency band, since the true time delay circuit is incapable of controlling the true time delay only with information about a single frequency, it is necessary to obtain information about at least two frequencies in order to perform SI signal cancellation in a wide band. Therefore, it is assumed that two or more pilot signals, two or more RSs, or two or more tones, which are test signals, are transmitted.

In order to control the SI reference generator, how to use multiple RSs (or multiple tones, multiple pilot signals, etc.), which are test signals, is described. First of all, the communication modem (or modem) shown in FIG. 14 may monitor a sum of powers of the multiple tones in frequencies in which the multiple tones corresponding to the test signals are located, measure respective powers at the frequency positions at which the multiple tones are transmitted to calculate the sum of the measured powers. Here, the powers measured at the frequency positions of the transmitted tones correspond to powers of SI signals.

The communication modem may transmit a control signal for minimizing a difference between the sum of the powers of the SI signals based on the multiple tones and a power of the SI RS. Namely, the communication modem may feed back a control signal for causing the sum of the powers of the SI signals based on the multiple tones to be minimum to the SI reference generator. The SI reference generator generates the SI reference signal according to the fed-back control signal. To control the sum of the measured powers of the SI signals, the communication modem may generate an SI RS having a power value closest to this sum.

The communication modem may control the SI reference generator using an adaptive feedback loop until the sum ($SI=SI_1+SI_2+SI_3+ \ldots +SI_n$) of the powers of the SI signals is minimized. Here, $SI_n$ is a power of an SI signal measured at a frequency position at which an n-th RS among a plurality of RSs is transmitted. The communication modem uses a periodic pulse signal of +1 and −1 to change a sign of an increment of a controlled bias voltage using a loop function of adaptive feedback. The loop function means a function for searching for surroundings of a current variable in a feedback loop including a variable to be controlled.

The communication modem may feed back control signals to the phase shifter, the attenuator, and the true time delay circuit, respectively, using the adaptive feedback loop so as to enable the SI reference generator to generate an SI RS having a power closest to the sum of the powers of the SI signals.

The method of controlling the SI RS according to FIG. 14 is advantageous in that complicated channel estimation and calibration are not required because the adaptive feedback algorithm is operated only with the sum of the powers of the multiple tones.

Figure 15:
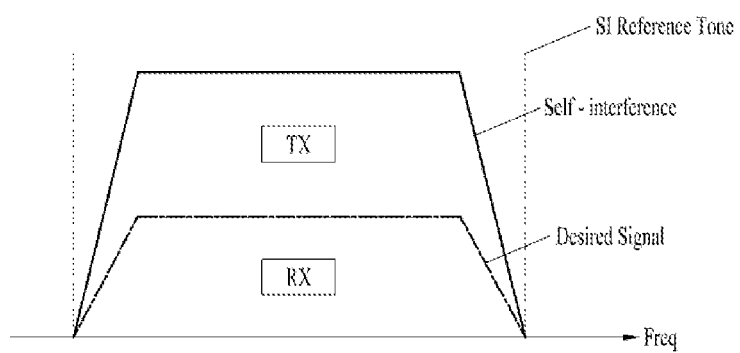
FIG. 15 is a diagram illustrating two tones transmitted in both sides of a communication band to control an SI reference generator.

FIG. 15 is a diagram illustrating two tones transmitted in both sides (e.g., a guard band) of a communication band to control an SI reference generator.

Referring to FIG. 15, SI channel estimation tones are included in both sides (a guard band) of the communication channel band and the SI reference generator may be controlled so as to reduce powers of the SI channel estimation tones according to the adaptive feedback algorithm. Then, a desired signal from which SI is cancelled may be stably received.

An inter-cell cooperation technology, coordinated multipoint transmission and reception (CoMP) was proposed to increase the throughput of a UE at a cell edge in legacy half-duplex mode. CoMP is a technology of reducing intercell interference and increasing the throughput of a cell-edge UE by enabling a serving cell and other neighboring cells to communicate with the same UE through cooperation between the cells.

In a current system in which a gNB (or BS) operates in half-duplex mode and a UE operates in full-duplex mode, the DL and UL of the gNB and the UE are managed separately based on channel measurements in some cases. When a UE conducts communication by establishing DL and UL with different gNBs, a gNB should identify with which gNB the UE has established a DL or UL channel to generate DL-/UL-DCI for HARQ and MCS level control, power control, and so on by reflecting a feedback signal received from the UE.

Figure 16:
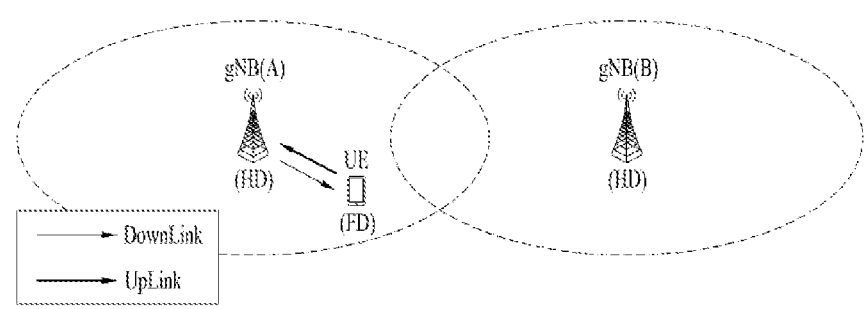
FIG. 16 is a diagram illustrating a case in which a DL channel and a UL channel have been established between the same next-generation Node B (gNB) and a UE, which is applicable to the present disclosure.

FIG. 16 is a diagram illustrating a case in which a DL channel and a UL channel have been established between the same gNB and a UE, which is applicable to the present disclosure.

Referring to FIG. 16, because a UE is located at the center of a cell, DL and UL may be established between the same gNB and the UE, when a DL measurement result and a UL measurement result are better than those of signals transmitted to and received from other cells. In this case, the gNB and the UE are connected in a one-to-one correspondence, and thus the gNB may generate DL-/UL-DCI for UL/DL HARQ operations, MCS level control, power control, and so on, determining that a received channel state feedback (e.g., a CQI or an ACK/NACK) is a measurement report for its transmitted signal. However, when the DL and UL between the gNB and the UE are separately managed based on channel measurements, DL and UL are highly likely to be generated between a cell-edge UE and different gNBs.

Figure 17:
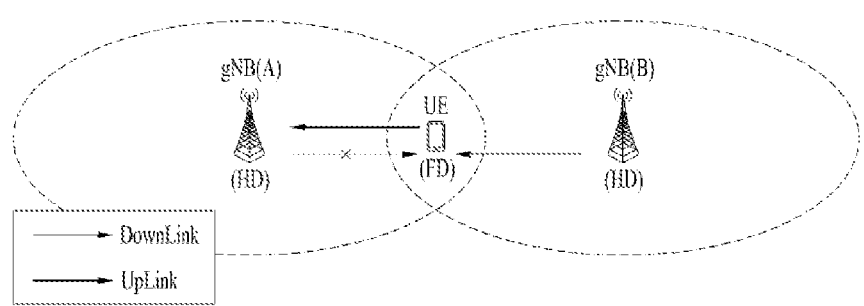
FIG. 17 is a diagram illustrating a case in which a DL channel is switched from gNB(A) to gNB(B), which is applicable to the present disclosure.
Figure 18:
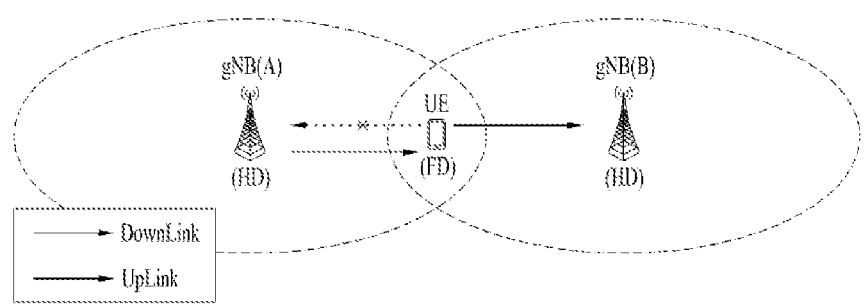
FIG. 18 is a diagram illustrating a case in which a UL channel is switched from gNB(A) to gNB(B), which is applicable to the present disclosure.

FIG. 17 is a diagram illustrating a case in which a DL channel is switched from gNB(A) to gNB(B), which is applicable to the present disclosure, and FIG. 18 is a diagram illustrating a case in which a UL channel is switched from gNB(A) to gNB(B), which is applicable to the present disclosure.

Referring to FIG. 17, when a DL signal received from gNB(B) has a better channel quality than a DL signal received from gNB(A), the DL of a UE is changed from gNB(A) to gNB(B). When communication is conducted in this situation, the UE reports a channel state feedback (e.g., a CQI or an ACK/NACK) for gNB(B) to gNB(A). gNB(B) needs the feedback information transmitted to gNB(A) to generate DL-/UL-DCI for a DL-related HARQ operation, MCS level control, power control, and so on. Referring to FIG. 18, when a UL signal received by gNB(B) has a better channel quality than a UL signal received by gNB(A), the UL of the UE is changed from gNB(A) to gNB(B). When communication is conducted in this situation, the UE reports a channel state feedback (e.g., a CQI or an ACK/NACK) for gNB(A) to gNB(B). gNB(A) needs the feedback information for gNB(A) transmitted to gNB(B) to generate DL-/UL-DCI for a DL-related HARQ operation, MCS level control, power control, and so on.

Accordingly, the present disclosure is intended to propose a procedure of transmitting information (CSI, a CQI, or an ACK/NACK) which has been received from a UE by a gNB operating on the UL of the UE to another gNB operating on the DL of the UE, when the UE operates in full-duplex mode and the gNBs operate in half-duplex mode in an environment in which inter-cell communication similar to CoMP is possible.

When gNBs operate in the half-duplex mode and UEs operate in the full-duplex mode, target gNBs may be different for the DL and UL of a UE according to channel qualities between the UE and the gNBs. In this case, a gNB operating on the UL (gNB-UL) should indicate to a gNB operating on the DL (gNB-DL) that a UL feedback channel received by the gNB-UL is the result of measuring a channel received from the gNB-DL. Further, the gNB-UL should indicate the result of decoding the signal received on the UL by UL-DCI, for use in the next procedure. The present disclosure proposes a procedure of transmitting information from a gNB-UL to a gNB-DL by using a cell ID, based on the assumption that the gNBs are capable of communicating with each other.

<Proposal 1> Method of Reflecting gNB-DL Cell ID in Scrambling Sequence

Figure 19:
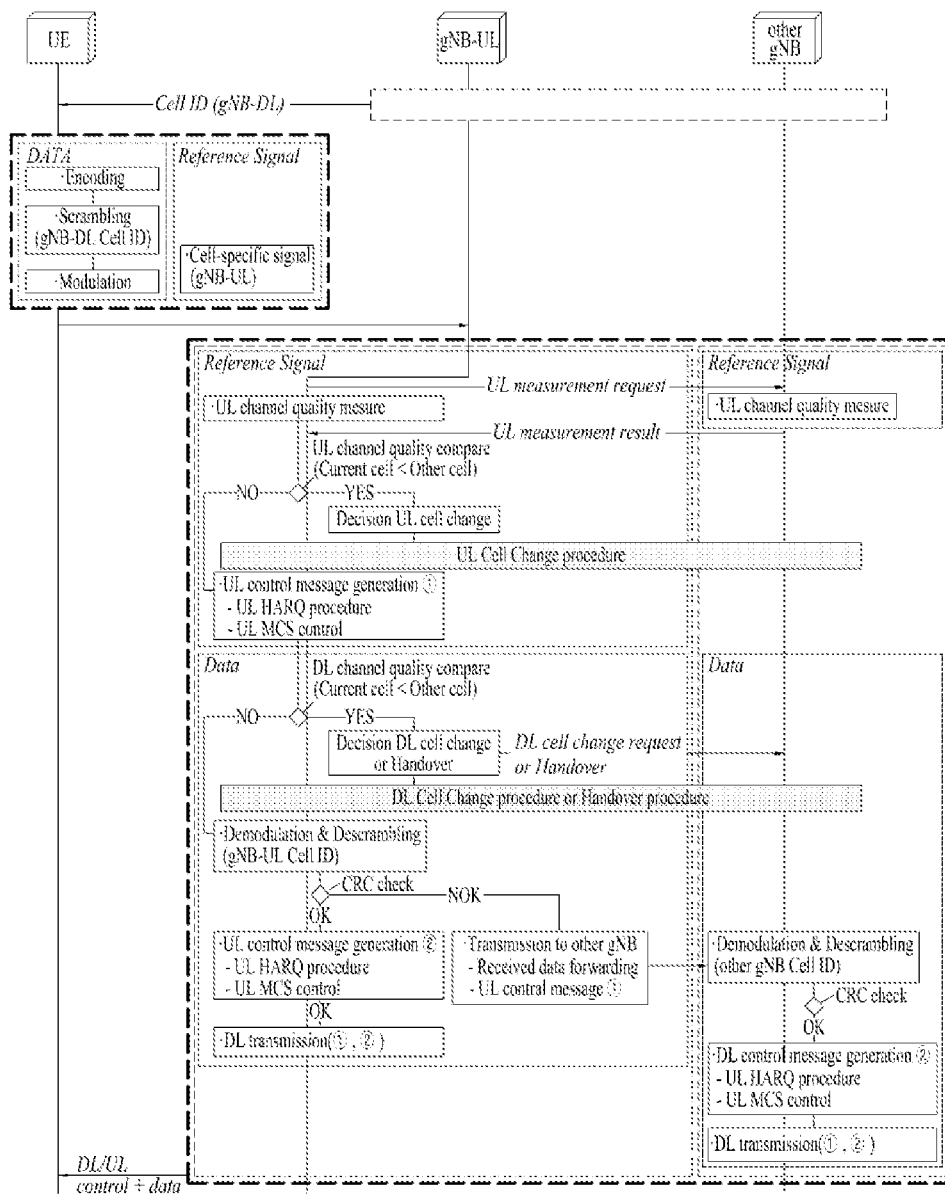
FIG. 19 is a diagram illustrating a procedure of reflecting a gNB-DL cell ID in generating a scrambling sequence, which is applicable to the present disclosure.

FIG. 19 is a diagram illustrating a procedure of reflecting a gNB-DL cell ID in generating a scrambling sequence, which is applicable to the present disclosure.

Referring to FIG. 19, a UE transmits, to a gNB-UL, a signal scrambled with a scrambling sequence which has been generated by reflecting a gNB-DL cell ID. FIG. 19 illustrates a procedure between a UE and a gNB by applying the operation. The gNB-UL may descramble the received signal by applying its cell ID and then determine whether the signal is a feedback destined for its cell by a CRC check. When the result of the CRC check is OK, the gNB-UL generates a new DL message with a DL control message generated for a DL HARQ procedure or MCS level control and a UL control message together, and transmits the new DL message to the UE, recognizing that the UE has established the DL with its cell.

On the contrary, when the result of the CRC check is NOK, the gNB-UL forwards the received signal to another gNB along with a measurement of the UL channel, recognizing that the received signal is not a feedback for its cell. Upon receipt of the signal, the other gNB may descramble the received signal with its cell ID and then determine that the signal is a feedback destined for its cell by a CRC check. When the received signal is a feedback for its transmitted DL signal, the other gNB generates a new DL message with a DL control message generated for a DL HARQ procedure or MCS level control and a UL control message received from the gNB-UL together, and transmits the new DL message to the UE, recognizing that the UE has established the DL with its cell.

<Proposal 2> Method of Including gNB-DL Cell ID in Message Header

Figure 20:
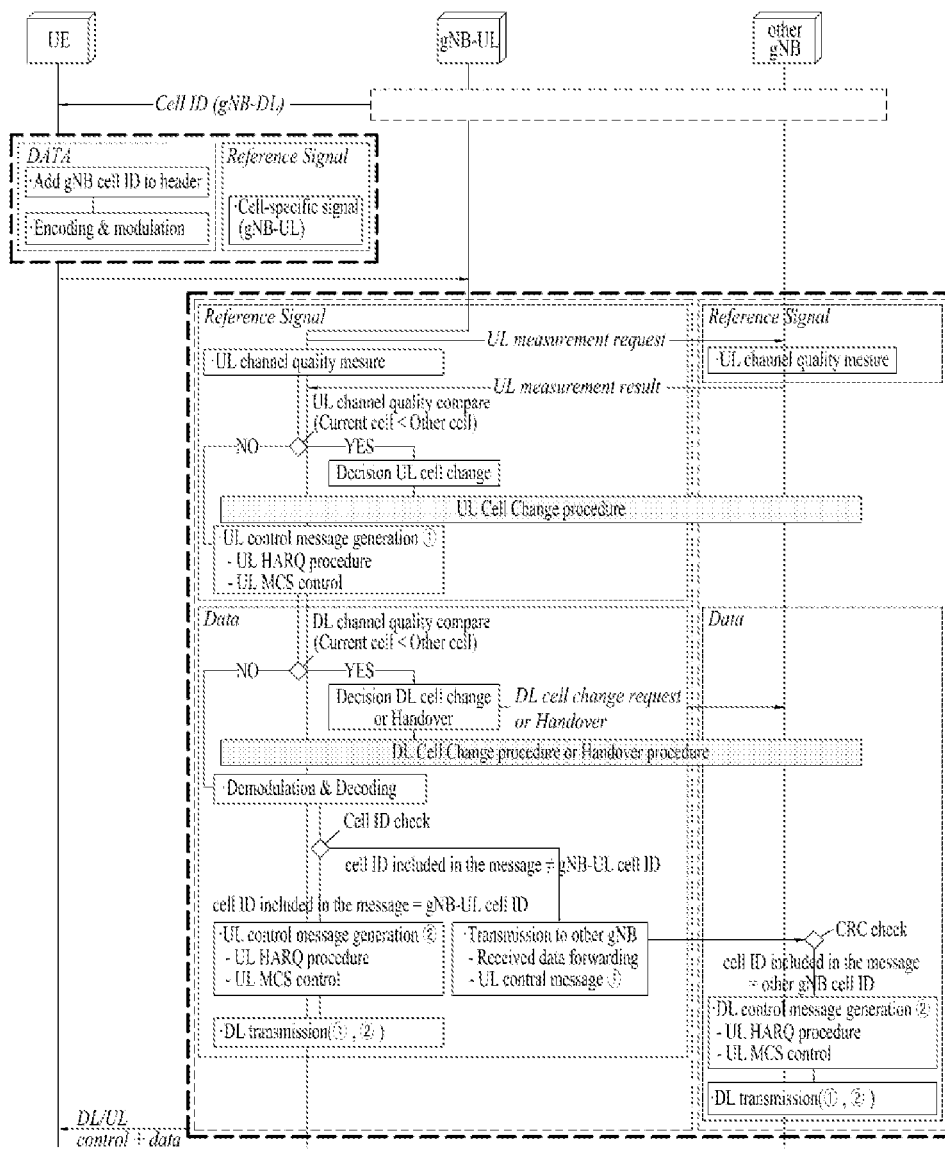
FIG. 20 is a diagram illustrating a procedure of reflecting a gNB-DL cell ID in a message header, which is applicable to the present disclosure.

FIG. 20 is a diagram illustrating a procedure of reflecting a gNB-DL cell ID in a message header, which is applicable to the present disclosure.

Referring to FIG. 20, a gNB-DL cell ID is transmitted in a message header. After decoding the message header, a gNB-UL may determine whether the cell ID included in the message header is identical to its cell ID. When the cell IDs are different, the gNB-UL forwards the received signal to another gNB as in <proposal 1>. Upon receipt of the signal, the other gNB may identify that the signal is a feedback for its transmitted DL signal by the gNB-DL cell ID in the message header.

<Proposal 3> Method of Indicating gNB-DL Cell ID by RRC Message

Figure 21:
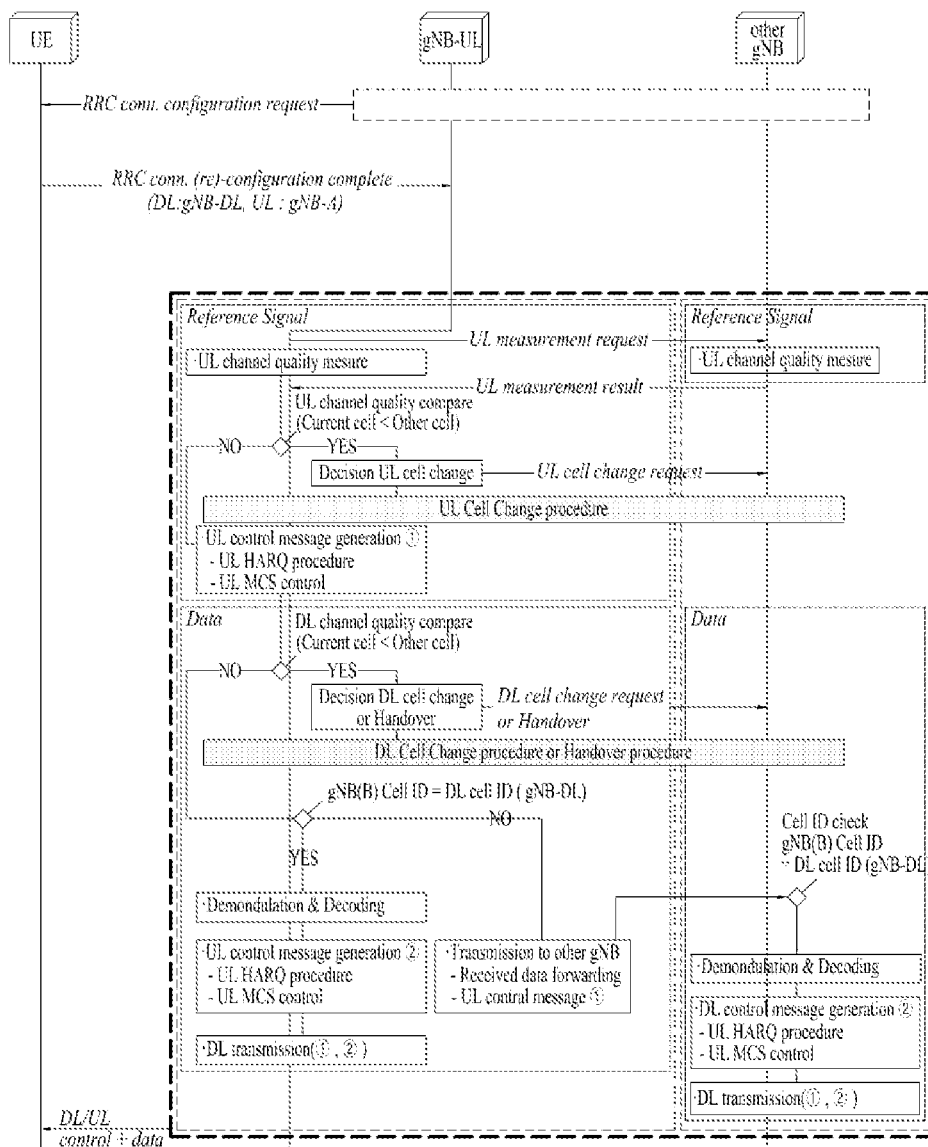
FIG. 21 is a diagram illustrating a procedure of indicating a gNB-DL cell ID by a radio resource control (RRC) message, which is applicable to the present disclosure.

FIG. 21 is a diagram illustrating a procedure of indicating a gNB-DL cell ID by an RRC message, which is applicable to the present disclosure.

Referring to FIG. 21, a gNB-DL cell ID and a gNB-UL cell ID are shared between a gNB and a UE by an RRC message. As illustrated in FIG. 21, when transmitting an RRC configuration complete message in response to an RRC configuration message which is generated each time a DL/UL cell ID is changed, the UE transmits a current gNB-DL cell ID and gNB-UL cell ID in the message. Upon receipt of the message, a gNB-UL may identify a gNB for which an upcoming UL feedback signal is a feedback. When the cell ID in the message does not match its cell ID, the gNB-UL forwards the received signal to the gNB.

The proposals of the present disclosure may be summarized as follows.

1) A DL/UL feedback procedure when a UE establishes a DL channel and a UL channel with different gNBs, respectively.

2) A method of performing a UL-related channel measurements comparison and feedback procedure by a gNB operating on UL and transmitting information received signal through the UL to a gNB operating on DL, when a UE establishes a DL channel and a UL channel with the different gNBs, respectively.

3) When a UE establishes a DL channel and a UL channel with different gNBs, respectively, the gNB operating on DL compares DL-related channel measurements and performs a feedback procedure.

4) A method of determining whether a gNB operating on UL is a gNB operating on DL based on a cell ID received from a UE, and when the gNB operating on UL is not the gNB operating on DL, forwarding a received signal to the other gNB by the gNB operating on UL.

A. The gNB operating on DL is identified by a DL cell ID applied to scrambling.

B. The gNB operating on DL is identified by a DL cell ID included in a message header.

C. The gNB operating on DL is identified by sharing a DL/UL cell ID between a gNB and a UE by an RRC message.

As described above, the present disclosure enables efficient communication by identifying a gNB-UL and a gNB-DL by cell IDs and forwarding information received on UL to the gNB-DL in the proposed procedures.

Hereinbelow, devices for performing the above-described proposed methods will be described in detail.

Examples of Communication System to which the Present Disclosure is Applied

The description, functions, procedures, proposals, methods, and/or operational flowcharts disclosed in the present disclosure may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 22:
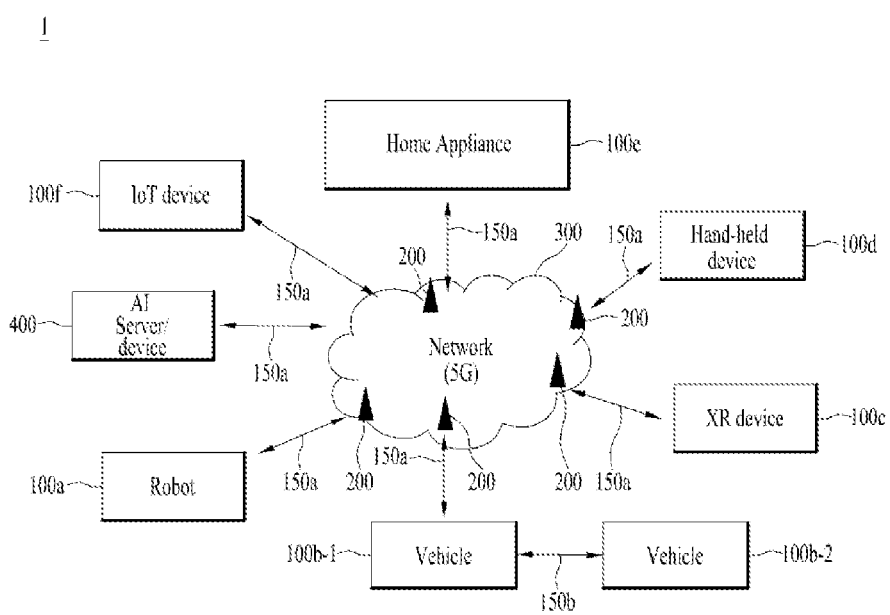
FIG. 22 illustrates a communication system applied to the present disclosure.

FIG. 22 illustrates a communication system applied to the present disclosure.

Referring to FIG. 22, a communication system 1 applied to the present disclosure includes wireless devices, BSs, and a network. Here, the wireless devices represent devices performing communication using RAT (e.g., 5G NR) or LTE) and may be referred to as communication/radio/5G devices. The wireless devices may include, without being limited to, a robot 100a, vehicles 100b-1 and 100b-2, an extended reality (XR) device 100c, a handheld device 100d, a home appliance 100e, an Internet of things (IoT) device 100f, and an artificial intelligence (AI) device/server 400. For example, the vehicles may include a vehicle having a wireless communication function, a self-driving vehicle, and a vehicle capable of performing vehicle-to-vehicle communication. The vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, digital signage, a vehicle, a robot, etc. The handheld device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smart meter. For example, the BSs and the network may also be implemented as wireless devices and a specific wireless device 200a may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/vehicle-to-everything (V2X) communication). In addition, the IoT device 100f (e.g., a sensor) may perform direct communication with other IoT devices (e.g., sensors) or other wireless devices 100a to 100f.

Wireless communication/connections 150a, 150b, and 150c may be established between the wireless devices 100a to 100f and the BSs 200, between wireless devices 100a to 100f, and between the BSs 200, respectively. Here, the wireless communication/connections may be established using various RATs (e.g., 5G NR) such as UL/DL communication 150a, sidelink communication 150b (or D2D communication), and communication 15c between the BSs (e.g., a relay or integrated access backhaul (IAB)). The wireless devices and the BSs, the wireless device and the wireless device, and the BS and the BS may transmit/receive radio signals to/from each other through the wireless communication/connections 150a, 150b, and 150c. For example, the wireless communication/connections 150a, 150b, and 150c may transmit/receive signals through various physical channels. To this end, at least a part of various configuration information configuring processes, various signal processing processes (e.g., channel encoding/decoding, modulation/demodulation, and resource mapping/demapping), and various resource allocation processes, for transmitting/receiving radio signals, may be performed based on the various proposals of the present disclosure.

Examples of Wireless Devices to which the Present Disclosure is Applied

Figure 23:
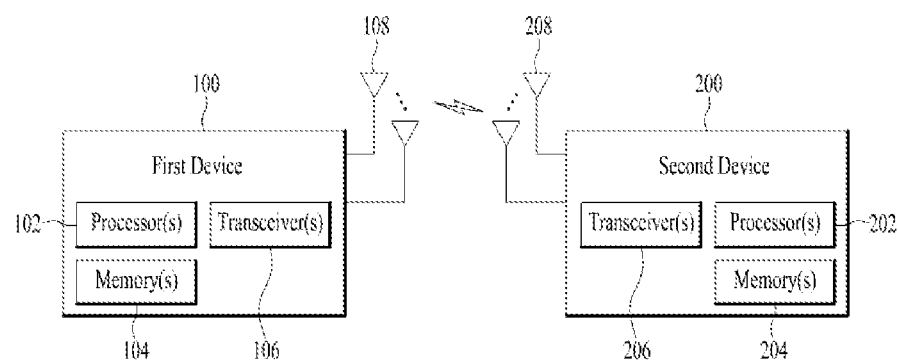
FIG. 23 illustrates wireless devices applicable to the present disclosure.

FIG. 23 illustrates wireless devices applicable to the present disclosure.

Referring to 37, a first wireless device 100 and a second wireless device 200 may transmit and receive signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 22.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the description, functions, procedures, proposals, methods, and/or operational flowcharts disclosed in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or the entirety of processes controlled by the processor(s) 102 or store software code including instructions for performing the description, functions, procedures, proposals, methods, and/or operational flowcharts disclosed in the present disclosure. Here, the processor(s) 102 and the memory(s) 104 may be a part of a communication modem/circuit/chipset designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with RF unit(s). In the present disclosure, the wireless device may represent the communication modem/circuit/chipset.

Specifically, the chipset may include the processor(s) 102 and the memory(s) 104. The memory(s) 104 may include at least one program capable of performing an operation related to the above-described embodiments. The processor(s) 102 may receive FDR-related resources that are allocated based on the at least one program stored in the memory(s) 104.

The processor(s) 102 may control the transceivers(s) 106 to report self-IC capability to the BS. The processor(s) 102 may control the transceivers(s) 106 to receive resource allocation information about a preconfigured time duration divided into a first time resource duration and a second time resource duration from the BS. The first time resource duration may be a time resource duration allocated to simultaneously perform transmission of a UL signal and reception of a DL signal in the same frequency band, and the second time resource duration may be a time resource duration allocated for transmission of the UL signal or reception of the DL signal. The first time resource duration and the second time resource duration may be determined based on the self-IC capability, the amount of first data related to the UL signal, and the amount of second data related to the DL signal.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the description, functions, procedures, proposals, methods, and/or operational flowcharts disclosed in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or the entirety of processes controlled by the processor(s) 202 or store software code including instructions for performing the description, functions, procedures, proposals, methods, and/or operation flowcharts disclosed in the present disclosure. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent the communication modem/circuit/chipset.

The processor(s) 202 related to the BS may control the transceivers(s) 206 to receive a report on self-IC capability related to FDR from the UE. The processor(s) 202 may determine a first time resource duration during which transmission and reception of UL and DL signals are simultaneously performed and a second time resource duration during which transmission of the UL signal or reception of the DL signal is performed. The processor(s) 202 may control the transceiver(s) 206 to transmit resource allocation information including information about the first time resource duration and the second time resource duration to the UE.

As another aspect of the present disclosure, a computer readable storage medium including at least one computer program for causing, when executed, the at least one processor to perform an operation is provided. The operation may include providing information related to self-IC capability to the BS and receiving resource allocation information about a preconfigured time duration divided into a first time resource duration and a second time resource duration from the BS. The first time resource duration may be a time resource duration allocated to simultaneously perform transmission of a UL signal and reception of a DL signal in the same frequency band, and the second time resource duration may be a time resource duration allocated for transmission of the UL signal or reception of the DL signal. The first time resource duration and the second time resource duration may be determined based on the self-IC capability, the amount of first data related to the UL signal, and the amount of second data related to the DL signal.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the description, functions, procedures, proposals, methods, and/or operational flowcharts disclosed in the present disclosure. The one or more processors 102 and 202 may generate messages, control information, data, or information according to the description, functions, procedures, proposals, methods, and/or operational flowcharts disclosed in the present disclosure. The one or more processors 102 and 202 may generate signals (e.g., baseband signals) including PDUs, SDUs, messages, control information, data, or information according to the description, functions, procedures, proposals, methods, and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the description, functions, procedures, proposals, methods, and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The description, functions, procedures, proposals, methods, and/or operational flowcharts disclosed in the present disclosure may be implemented using firmware or software, and the firmware or software may be configured to include the modules, procedures, or functions. Firmware or software configured to perform the description, functions, procedures, proposals, methods, and/or operational flowcharts disclosed in the present disclosure may be included in the one or more processors 102 and 202 or stored in the one or more memories 104 and 204 so as to be driven by the one or more processors 102 and 202. The description, functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured as read-only memories (ROMs), random access memories (RAMs), electrically erasable programmable read-only memories (EPROMs), flash memories, hard drives, registers, cache memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the description, functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the description, functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Use Cases of Wireless Devices to which the Present Disclosure is Applied

Figure 24:
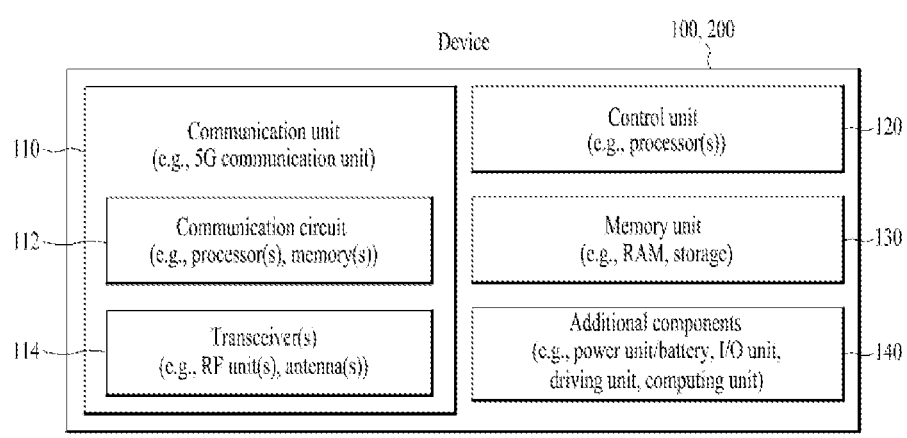
FIG. 24 illustrates another example of a wireless device applied to the present disclosure.

FIG. 24 illustrates another example of a wireless device applied to the present disclosure. The wireless device may be implemented in various forms according to use cases/services.

Referring to FIG. 24, wireless devices 100 and 200 may correspond to the wireless devices 100 and 200 of FIG. 23 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 23. For example, the transceiver(s) 114 may include the one or more transceivers 106 and 206 and/or the one or more antennas 108 and 208 of FIG. 23. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, an input/output (I/O) unit, a driving unit, and a computing unit. The wireless device may be implemented in the form of, without being limited to, the robot (100a of FIG. W1), the vehicles (100b-1 and 100b-2 of FIG. 22), the XR device (100c of FIG. 22), the handheld device (100d of FIG. 22), the home appliance (100e of FIG. 22), the IoT device (100f of FIG. 22), a digital broadcast terminal, a holographic device, a public safety device, an MTC device, a medicine device, a fintech device (or a finance device), a security device, a climate/environment device, the AI server/device (400 of FIG. 22), the BSs (200 of FIG. 22), a network node, etc. The wireless device may be used in a mobile or fixed place according to a use case/service.

In FIG. 24, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphics processing unit, and a memory control processor. As another example, the memory 130 may be configured by a random access memory (RAM), a dynamic RAM (DRAM), a read only memory (ROM)), a flash memory, a volatile memory, a non-volatile memory, and/or a combination thereof.

Hereinafter, an implementation example of FIG. 24 will be described in detail with reference to the drawings.

Example of Handheld Device to which Present Disclosure is Applied

Figure 25:
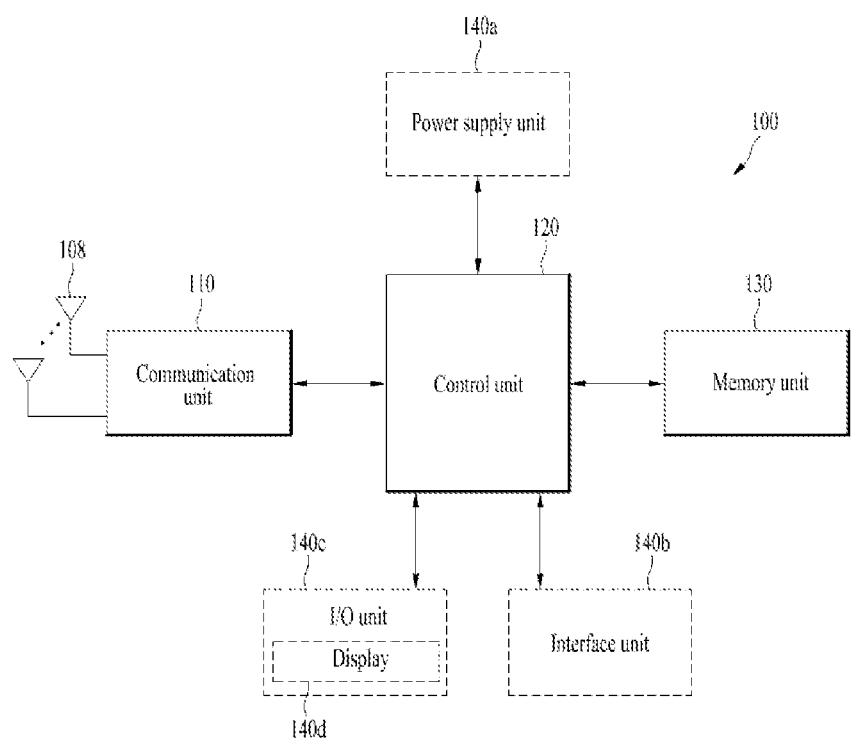
FIG. 25 illustrates a handheld device applied to the present disclosure.

FIG. 25 illustrates a handheld device applied to the present disclosure. The handheld device may include a smartphone, a smartpad, a wearable device (e.g., a smartwatch or smartglasses), or a portable computer (e.g., a notebook). The handheld device may be referred to as an MS, a UT, an MSS, an SS, an AMS, or a WT.

Referring to FIG. 25, a handheld device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 24, respectively.

The communication unit 110 may transmit and receive signals (e.g., data and control signals) to and from other wireless devices or BSs. The control unit 120 may perform various operations by controlling constituent elements of the handheld device 100. The control unit 120 may include an application processor (AP). The memory unit 130 may store data/parameters/programs/code/commands needed to drive the handheld device 100. The memory unit 130 may store input/output data/information. The power supply unit 140a may supply power to the handheld device 100 and include a wired/wireless charging circuit, a battery, etc. The interface unit 140b may support connection of the handheld device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may covert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 26:
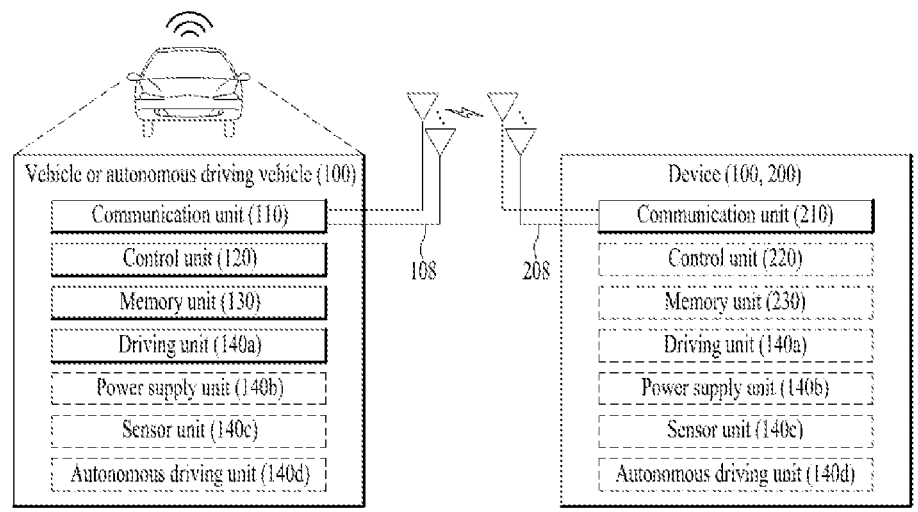
FIG. 26 illustrates a vehicle or an autonomous driving vehicle applied to the present disclosure.

Example of Vehicle or Self-Driving Vehicle to which Present Disclosure is Applied FIG. 26 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 26, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110, 130, and 140*a* to 140*d* correspond to the blocks 110, 130, and 140 of FIG. 24, respectively.

The communication unit 110 may transmit and receive signals (e.g., data and control signals) to and from external devices such as other vehicles, BSs (e.g., RSUs), and servers. The control unit 120 may perform various operations by controlling elements of the vehicle or the autonomous driving vehicle 100. The control unit 120 may include an ECU. The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane in which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

As is apparent from the foregoing description, when a UE establishes a DL channel and a UL channel with different gNBs in an FDR environment, the present disclosure enables efficient communication by transmitting information received on UL to a gNB operating on DL by using a cell ID in the proposed procedures.

The above-described embodiments of the present disclosure are applicable to various mobile communication systems.

The above-described embodiments are combinations of elements and features of the present disclosure in specific forms. The elements or features may be considered selective unless mentioned otherwise. Each element or feature may be implemented without being combined with other elements or features. Further, the embodiments of the present disclosure may be configured by combining some elements and/or some features. Operation orders described in the embodiments of the present disclosure may be rearranged. Some constructions or features of any one embodiment may be included in another embodiment or may be replaced with corresponding constructions or features of another embodiment. It is obvious that claims that are not explicitly cited in the appended claims may be presented in combination as an embodiment of the present disclosure or included as a new claim by subsequent amendment after the application is filed.

In the present disclosure, the embodiments of the present disclosure have been described mainly focusing on a signal transmission and reception relationship between a UE and a BS. Such as signal transmission and reception relationship may be equally or similarly extended even to signal transmission and reception between the UE and a relay or between the BS and the relay. In the present disclosure, a specific operation described as being performed by the BS may also be performed by an upper node of the BS. That is, it is apparent that, in a network consisting of a plurality of network nodes including the BS, various operations performed for communication with the UE may be performed by the BS, or network nodes other than the BS.

The embodiments of the present disclosure may be implemented by various means, for example, hardware, firmware, software, or a combination thereof. In a hardware configuration, the methods according to exemplary embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present disclosure may be implemented in the form of a module, a procedure, a function, etc. that perform the above-described functions or operations. Software code may be stored in a memory unit and be executed by a processor. The memory unit may be located at the interior or exterior of the processor and may transmit and receive data to and from the processor via various known means.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A method of transmitting and receiving a signal by a serving base station (BS) in a wireless communication system, the method comprising:
   receiving, from a user equipment (UE), an uplink (UL) signal including a cell identifier (ID) of a first BS transmitting a downlink (DL) signal to the UE;
   determining whether the cell ID of the first BS is identical to a cell ID of the serving BS;
   transmitting a DL signal to the UE based on the cell ID of the first BS being identical to the cell ID of the serving BS; and
   transmitting information on the UL signal to the first BS based on the cell ID of the first BS being different from the cell ID of the serving BS,
   wherein the UE supports full-duplex radio, and the UL signal includes a feedback for a DL signal transmitted by the first BS.

2. The method according to claim 1, wherein the first BS and the serving BS operate in coordinated multi-point transmission and reception (CoMP).

3. The method according to claim 1, wherein a scrambling sequence generated by using the cell ID of the first BS has been applied to the UL signal.

4. The method according to claim 1, wherein a message header of data included in the UL signal includes the cell ID of the first BS.

5. The method according to claim 1, wherein the cell ID of the first BS is received in a radio resource control (RRC) message.

6. The method according to claim 3, further comprising descrambling the UL signal based on the cell ID of the serving BS.

7. The method according to claim 4, further comprising decoding the UL signal, and
   determining whether the cell ID of the first BS is identical to the cell ID of the serving BS based on the message header.

8. A serving base station (BS) for transmitting and receiving a signal in a wireless communication system, the BS comprising:
   a transmitter;
   a receiver; and
   a processor,
   wherein the receiver is configured to receive, from a user equipment (UE), an uplink (UL) signal including a cell identifier (ID) of a first BS transmitting a downlink (DL) signal to the UE, the processor is configured to determine whether the cell ID of the first BS is identical to a cell ID of the serving BS, and the transmitter is configured to transmit a DL signal to the UE based on the cell ID of the first BS being identical to the cell ID of the serving BS, and transmit information on the UL signal to the first BS based on the cell ID of the first BS being different from the cell ID of the serving BS, and
   wherein the UE supports full-duplex radio, and the UL signal includes a feedback for a DL signal transmitted by the first BS.

9. The BS according to claim 8, wherein a scrambling sequence generated by using the cell ID of the first BS has been applied to the UL signal.

10. A method of transmitting and receiving a signal by a user equipment (UE) in a wireless communication system, the method comprising:
    transmitting, to a serving base station (B S), an uplink (UL) signal including a cell identifier (ID) of a first BS transmitting a downlink (DL) signal to the UE; and
    receiving a DL signal from the BS based on the cell ID of the first BS being identical to the cell ID of the serving BS,
    wherein based on the cell ID of the first BS being different from the cell ID of the serving the serving BS, information on the UL signal is transmitted to the first BS through the serving BS, and
    wherein the UE supports full-duplex radio, and the UL signal includes a feedback for a DL signal transmitted by the first BS.

11. The method according to claim 10, wherein a scrambling sequence generated by using the cell ID of the first BS has been applied to the UL signal.

12. The method according to claim 10, wherein a message header of data included in the UL signal includes the cell ID of the first BS.

13. A user equipment (UE) for transmitting and receiving a signal in a wireless communication system, the UE comprising:
    a transmitter;
    a receiver; and
    a processor,
    wherein the transmitter is configured to transmit, to a serving base station (B S), an uplink (UL) signal including a cell identifier (ID) of a first BS transmitting a downlink (DL) signal to the UE, and the receiver is configured to receive a DL signal from the BS based on the cell ID of the first BS being identical to the cell ID of the serving BS,
    wherein based on the cell ID of the first BS being different from the cell ID of the serving BS, information on the UL signal is transmitted to the first BS through the serving BS, and
    wherein the UE supports full-duplex radio, and the UL signal includes a feedback for a DL signal transmitted by the first BS.

14. An apparatus for a user equipment (UE), comprising:
    at least one processor; and
    at least one computer memory operatively coupled to the at least one processor and storing instructions which, when executed, cause the at least one processor to perform operations,
    wherein the operations include:
    transmitting, to a serving base station (BS), an uplink (UL) signal including a cell identifier (ID) of a first BS transmitting a downlink (DL) signal to the UE; and
    receiving a DL signal from the BS based on the cell ID of the first BS being identical to the cell ID of the serving BS,
    wherein based on the cell ID of the first BS being different from the cell ID of the serving BS, information on the UL signal is transmitted to the first BS through the serving BS, and
    wherein the UE supports full-duplex radio, and the UL signal includes a feedback for a DL signal transmitted by the first BS.

15. A non-transitory computer-readable storage medium storing at least one computer program including instructions which, when executed by at least one processor, cause the at least one processor to perform operations for a user equipment (UE),
    wherein the operations include:
    transmitting, to a serving base station (B S), an uplink (UL) signal including a cell identifier (ID) of a first BS transmitting a downlink (DL) signal to the UE; and receiving a DL signal from the BS based on the cell ID of the first BS being identical to the cell ID of the serving BS, wherein based on the cell ID of the first BS being different from the cell ID of the serving BS, information on the UL signal is transmitted to the first BS through the serving BS, and wherein the UE supports full-duplex radio, and the UL signal includes a feedback for a DL signal transmitted by the first BS.

* * * * *